(12) United States Patent
Nammi et al.

(10) Patent No.: US 11,012,986 B2
(45) Date of Patent: May 18, 2021

(54) FIRST COMMUNICATION DEVICE, SECOND COMMUNICATION DEVICE AND METHODS THEREIN FOR SENDING AND DECODING, RESPECTIVELY, DOWNLINK INFORMATION

(71) Applicant: Telefonaktiebolaget LM Ericsson (publ), Stockholm (SE)

(72) Inventors: Sairamesh Nammi, Austin, TX (US); Dominque Everaere, Åkersberga (SE); Christian Hoymann, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 273 days.

(21) Appl. No.: 15/579,472

(22) PCT Filed: Jun. 3, 2016

(86) PCT No.: PCT/SE2016/050532
§ 371 (c)(1),
(2) Date: Dec. 4, 2017

(87) PCT Pub. No.: WO2016/195585
PCT Pub. Date: Dec. 8, 2016

(65) Prior Publication Data
US 2018/0152925 A1 May 31, 2018

Related U.S. Application Data

(60) Provisional application No. 62/171,422, filed on Jun. 5, 2015, provisional application No. 62/215,422, filed on Sep. 8, 2015.

(51) Int. Cl.
*H04W 72/12* (2009.01)
*H04W 72/04* (2009.01)
(Continued)

(52) U.S. Cl.
CPC ............ *H04W 72/042* (2013.01); *H04L 5/14* (2013.01); *H04W 72/044* (2013.01);
(Continued)

(58) Field of Classification Search
CPC ..................................................... H04L 5/14
See application file for complete search history.

(56) References Cited

U.S. PATENT DOCUMENTS 6,944,146 B1 * 9/2005 Barany ............ H04W 72/0406
370/329
8,644,834 B2 * 2/2014 Ahluwalia ........ H04W 36/0055
455/439

(Continued)

FOREIGN PATENT DOCUMENTS

CN 104412685 A 3/2015
CN 104412686 A 3/2015
(Continued)

OTHER PUBLICATIONS

3GPP, "3rd Generation Partnership Project; Technical Specification Group Radio Access Network; Evolved Universal Terrestrial Radio Access (E-UTRA); Feasibility study on possible additional configuration for LTE Time Division Duplex (TDD) (Release 13)", 3GPP TR 36.825 V13.0.0, Sep. 2015, 1-35.

(Continued)

*Primary Examiner* — Hassan A Phillips
*Assistant Examiner* — Prenell P Jones
(74) *Attorney, Agent, or Firm* — Christopher & Weisberg, P.A.

(57) ABSTRACT

Method performed by a first communication device (101) for sending downlink information to a second communication device (102). The first communication device (101) and the second communication device (102) operate in a communications network (100). The first communication device
(Continued)

(101) determines (702) whether or not one or more third communication devices (103) operating in the communications network (100) are sending uplink information on an adjacent carrier (142). The adjacent carrier (142) is adjacent to a carrier (141) assigned to the first communication device (101) for sending the downlink information to the second communication device (102). The first communication device (101) sends (703) the downlink information to the second communication device (102) on the carrier (141) when it has determined that the one or more third communication devices (103) are not sending uplink information on the adjacent carrier (142) to the carrier (141).

20 Claims, 17 Drawing Sheets

(51) Int. Cl.
*H04W 72/08* (2009.01)
*H04L 5/14* (2006.01)
*H04W 74/08* (2009.01)

(52) U.S. Cl.
CPC ..... *H04W 72/0453* (2013.01); *H04W 72/082* (2013.01); *H04W 72/12* (2013.01); *H04W 74/0808* (2013.01)

(56) References Cited

U.S. PATENT DOCUMENTS

| | | | | |
|---|---|---|---|---|
| 9,247,506 | B2* | 1/2016 | Krishnamurthy ... | H04W 52/243 |
| 9,253,783 | B2* | 2/2016 | Wang ................ | H04W 72/0486 |
| 9,674,809 | B1* | 6/2017 | Ramamurthy .... | H04W 72/0453 |
| 10,141,990 | B2* | 11/2018 | Wang ................. | H04B 7/0456 |
| 2004/0116114 | A1* | 6/2004 | Lewiner ............. | H04W 28/26 |
| | | | | 455/426.2 |
| 2007/0037595 | A1* | 2/2007 | Shpak ................. | H04W 28/18 |
| | | | | 455/509 |
| 2007/0041347 | A1* | 2/2007 | Beale ................. | H04W 48/10 |
| | | | | 370/335 |
| 2007/0081489 | A1* | 4/2007 | Anderson .......... | H04W 16/14 |
| | | | | 370/329 |
| 2010/0074151 | A1* | 3/2010 | Westerberg ........ | H04L 5/14 |
| | | | | 370/280 |
| 2010/0124880 | A1* | 5/2010 | Wu .................... | H04W 72/0473 |
| | | | | 455/7 |
| 2012/0236736 | A1* | 9/2012 | Frank ................. | H04W 24/04 |
| | | | | 370/252 |
| 2013/0028151 | A1* | 1/2013 | Ning ................... | H04B 7/2643 |
| | | | | 370/280 |
| 2013/0053081 | A1* | 2/2013 | Hulkkonen ......... | H04B 1/1027 |
| | | | | 455/509 |
| 2014/0177457 | A1* | 6/2014 | Grosspietsch ...... | H04W 24/02 |
| | | | | 370/252 |
| 2014/0198678 | A1* | 7/2014 | Kim ................... | H04W 24/06 |
| | | | | 370/252 |
| 2014/0248917 | A1* | 9/2014 | Scipione ........... | H04W 72/0406 |
| | | | | 455/509 |
| 2015/0085782 | A1 | 3/2015 | Seo et al. | |
| 2015/0124665 | A1 | 5/2015 | Park | |
| 2015/0189666 | A1* | 7/2015 | Wang ................ | H04W 72/1226 |
| | | | | 370/329 |
| 2015/0289141 | A1* | 10/2015 | Ghasemzadeh ....... | H04W 16/14 |
| | | | | 370/330 |
| 2016/0014781 | A1* | 1/2016 | Nagata .............. | H04W 72/0453 |
| | | | | 370/329 |

FOREIGN PATENT DOCUMENTS

| | | |
|---|---|---|
| EP | 2785128 A1 | 10/2014 |
| EP | 2833686 A1 | 2/2015 |
| EP | 2835918 A1 | 2/2015 |
| WO | 2013177780 A1 | 12/2013 |

OTHER PUBLICATIONS

Unknown, Author, "Configuration of PUCCH SCell", R2-152520, 3rd Generation Partnership Project (3GPP), vol. RAN WG2, No. Fukuoka, Japan, May 24, 2015, 1-2.
Unknown, Author, "PUCCH on SCell", R2-150389, 3rd Generation Partnership Project (3GPP), vol. RAN WG2, No. Athens, Greece; Feb. 9, 2015-Feb. 13, 2015, Feb. 8, 2015, 1-8.
Unknown, Author, "PUCCH on SCell for CA enhancement beyond 5CCs", R2-150290, 3rd Generation Partnership Project (3GPP), vol. RAN WG2, No. Athens, Greece; Feb. 9, 2015-Feb. 13, 2015, Feb. 8, 2015, 1-8.
Unknown, Author, "SR on PUCCH SCell", R2-151488, 3rd Generation Partnership Project (3GPP), vol. RAN WG2, No. Bratislava, Slovakia; Apr. 20, 2015-Apr. 24, 2015, Apr. 19, 2015, 1-8.
Unknown, Author, "SR support on PUCCH on SCell", R2-151287, 3rd Generation Partnership Project (3GPP), vol. RAN WG2, No. Bratislava, Slovakia; Apr. 20, 2015-Apr. 24, 2015, Apr. 19, 2015, 1-8.
Unknown, Author, "Considerations of introducing possible additional TDD configuration(s)", NEC, 3GPP TSG RAN Meeting #67, RP-150140, Shanghai, China, Mar. 9-12, 2015, 1-5.
Chinese Office Action with English Translation dated Jan. 26, 2021 for Application No. 2016800328314 filed Jun. 3, 2016, consisting of 12-pages.

* cited by examiner

FIRST COMMUNICATION DEVICE, SECOND COMMUNICATION DEVICE AND METHODS THEREIN FOR SENDING AND DECODING, RESPECTIVELY, DOWNLINK INFORMATION

TECHNICAL FIELD

The present disclosure relates generally to a first communication device and methods performed thereby for sending downlink information to a second communication device. The present disclosure also relates generally to the second communication device and methods performed thereby decoding downlink information received from the first communication device. The present disclosure further relates generally to a computer program product, comprising instructions to carry out the actions described herein, as performed by the first communication device, or by the second communication device. The computer program product may be stored on a computer-readable storage medium.

BACKGROUND

Communication devices such as wireless devices are also known as e.g. User Equipments (UE), mobile terminals, wireless terminals and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, wherein each cell area being served by an access node such as a Base Station (BS), e.g. a Radio Base Station (RBS), which sometimes may be referred to as e.g. Evolved Node B "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

3GPP LTE

3rd Generation Partnership Project (3GPP) Long-Term Evolution (LTE) represents a project within the third generation partnership project, with an aim to improve the Universal Mobile Telecommunications System (UMTS) standard. The 3GPP LTE radio interface offers high peak data rates, low delays and an increase in spectral efficiencies. The LTE physical layer is designed to achieve higher data rates, and is facilitated by turbo coding/decoding, and higher order modulations, up to 256-Quadrature Amplitude Modulation (QAM). The modulation and coding may be adaptive, and may depend on channel conditions. Orthogonal Frequency Division Multiple Access (OFDMA) may be used for the downlink, while Single Carrier Frequency Division Multiple Access (SC-FDMA) may be used for the uplink. The main advantage of such schemes is that the channel response is flat over a sub-carrier even though the multi-path environment may be frequency selective over the entire bandwidth. This may reduce the complexity involved in equalization, as simple single tap frequency domain equalizers, which may be understood as stateless or memoryless filters, may be used at the receiver. OFDMA allows LTE to achieve its goal of higher data rates, reduced latency and improved capacity/coverage, with reduced costs to the operator. The LTE physical layer supports Hybrid Automatic Repeat reQuest (H-ARQ), power weighting of physical resources, uplink power control, and Multiple-Input Multiple-Output (MIMO).

Duplex Schemes

The LTE ecosystem may support both Frequency Division Duplex (FDD) and Time Division Duplex (TDD). This may enable the operators to exploit both the paired and unpaired spectrum, since LTE may have flexibility in bandwidth, as it may support 6 bandwidths 1.4 MegaHertz (MHz), 3 MHz, 5 MHz, 10 MHz, 15 MHz and 20 MHz.

Frequency Division Duplex

In the case of FDD operation, there may be two carrier frequencies which are represented in FIG. 1, one for uplink transmission ($f_{uplink}$) and one for downlink transmission ($f_{downlink}$). During each frame, 10 Transmission Time Intervals (TTI) or subframes, there may thus be ten uplink subframes and ten downlink subframes, each represented in FIG. 1 as a box, and uplink and downlink transmission may occur simultaneously within a cell. Isolation between downlink and uplink transmissions may be achieved by transmission/reception filters, known as duplex filters, and a sufficiently large duplex separation in the frequency domain.

Time Division Duplex

In the case of TDD operation, there is a single carrier frequency only and uplink and downlink transmissions are separated in the time domain on a cell basis. For example, FIG. 2 shows an example of a TDD frame where some subframes, each represented in FIG. 2 as a box, are allocated for uplink transmissions and some subframes for downlink transmission, with the switch between downlink and uplink occurring in the special subframe denoted as S. Different asymmetries in terms of the amount of resource that is, subframes allocated for uplink and downlink transmission respectively may be provided through the seven different downlink/uplink configurations as shown in Table 1.

TABLE 1

TDD configurations supported in LTE

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Message Sequence Chart of Downlink Transmission

FIG. 3 shows an example of a typical message sequence chart for downlink data transfer in LTE. From the pilot or reference signals received from an eNB at 11, a UE may then at 12 compute the channel estimates, then compute the parameters that may be needed for Channel State Information (CSI) reporting. The CSI report may consist of, for example, channel quality information (CQI), a Precoding Matrix Index (PMI), a Rank Information (RI) etc. At 13, the CSI report is sent to the eNodeB via a feedback channel either Physical Uplink Control Channel (PUCCH), periodic CSI reporting, or Physical Uplink Shared Channel (PUSCH), aperiodic. At 14, the eNodeB scheduler may use this information in choosing the parameters for scheduling of this particular UE. At 15, the eNodeB sends the scheduling parameters to the UE in the downlink control channel called Physical Downlink Control CHannel (PDCCH). However, before sending the PDCCH, the eNode B sends control format indicator information on the Physical Control Format Indicator CHannel (PCFICH), which is a physical channel providing the UEs with information necessary to decode the set of downlink control channels (PDCCH). After that, actual data transfer takes place from eNodeB to the UE at 16, via the Physical Downlink Shared Channel (PDSCH).

Uplink Control Channel

In LTE, the uplink control channel may carry information about Hybrid Automatic Repeat reQuest (HARQ)—ACKnowledgment (ACK) information corresponding to the downlink data transmission, and channel state information. The channel state information may typically consist of a Rank Indicator (RI), CQI, and a PMI. Either the PUCCH or the PUSCH may be used to carry this information. The PUCCH reporting may be periodic, and the periodicity of the PUCCH may be configured by the higher layers, while the PUSCH reporting may be aperiodic. Also, there may be various modes for PUCCH and PUSCH, and, in general, the reporting may depend on the transmission mode, and the formats may be configured via higher layer signaling.

Downlink Control Channel

In LTE, the downlink control channel (PDCCH) may carry information about the scheduling grants. Typically, this may consist of a number of MIMO layers scheduled, transport block sizes, modulation for each codeword, parameters related to HARQ, sub band locations and also PMI corresponding to those sub bands.

Typically, the following information may be transmitted by means of the downlink control information (DCI) format: localized/distributed Virtual Resource Block (VRB) assignment flag, resource block assignment, modulation and coding scheme, HARQ process number, new data indicator, redundancy version, Transmitter Power Control (TPC) command for PUCCH, downlink assignment index, precoding matrix index, and number of layers.

Note that, all DCI formats may not use all the information as shown above. In general, the contents of PDCCH may depend on transmission mode and DCI format.

Carrier Aggregation in LTE

Carrier aggregation (CA) was introduced in Release 10 for LTE and/or LTE Advanced (LTE-A) to increase the bandwidth without any modifications of the baseband. In the case of carrier aggregation, multiple LTE carriers, each with a bandwidth up to 20 MHz may be transmitted in parallel to and/or from the same terminal, thereby allowing for an overall wider bandwidth, and correspondingly higher per-link data rates. In the context of carrier aggregation, each carrier may be referred to as a component carrier as, from a Radio Frequency (RF) point-of-view, the entire set of aggregated carriers may be seen as a single, RF, carrier. Till Release 12, up to 5 LTE/LTE-A component carriers may be aggregated, allowing for transmission bandwidths up to 40 MHz for High-Speed Packet Access (HSPA), and up to 100 MHz for LTE/LTE-A.

A terminal capable of carrier aggregation may receive or transmit simultaneously on multiple component carriers. Aggregated component carriers may not need to be contiguous in the frequency domain. Rather, with respect to the frequency location of the different component carriers, three different cases may be identified: intra-band aggregation with frequency-contiguous component carriers, intra-band aggregation with non-contiguous component carriers, and inter-band aggregation with non-contiguous component carriers.

A terminal capable of carrier aggregation may have one downlink primary component carrier and an associated uplink primary component carrier. In addition, it may have one or several secondary component carriers in each direction. Different terminals may have different carriers as their primary component carrier—that is, the configuration of the primary component carrier may be terminal specific.

Additional TDD Configurations in LTE

From the recent mobile data statistics, in general the traffic is asymmetric. This means that DL traffic may be much heavier than uplink. Hence, in order to support more downlink subframes for LTE-TDD systems, a 3GPP RAN plenary has discussed adding more downlink heavy configurations for the currently existing TDD configurations. The configurations under considerations are 10:0:0 and 9:1:0. Both the configurations are configured along with a standalone carrier as the primary carrier.

Downlink heavy configurations, however, with existing methods, negatively affect the performance of wireless devices due to increased interference, and result in degraded network communications.

SUMMARY

It is therefore an object of embodiments herein to improve the performance of a communications network by providing improved methods of sending downlink information, such as a downlink message.

According to a first aspect of embodiments herein, the object is achieved by a method performed by a first communication device. The method is for sending downlink information to a second communication device. The first communication device and the second communication device operate in a communications network. The first communication device determines whether or not one or more third communication devices operating in the communications network are sending uplink information on an adjacent carrier. The adjacent carrier is adjacent to a carrier assigned to the first communication device for sending the downlink information to the second communication device. The first communication device sends the downlink information to the second communication device on the carrier. This is done when the first communication device has determined that the one or more third communication devices are not sending uplink information on the adjacent carrier to the carrier used by the first communication device for sending the downlink information.

According to a second aspect of embodiments herein, the object is achieved by a method performed by the second communication device. The method is for decoding downlink data received from the first communication device. The first communication device and the second communication device operate in the communications network. The second communication device determines whether the second communication device is scheduled on the carrier, assigned to the second communication device for receiving downlink control information from the first communication device, or on another carrier. The determining is based on whether time-frequency resources in which the determining is performed are configured to allow the sending of uplink information, or not, on the adjacent carrier. The adjacent carrier is adjacent to the carrier wherein the sending is by the one or more third communication devices operating in the communications network. The second communication device receives the downlink data from the first communication device. The second communication device also decodes the received downlink data based on the determining whether the second communication device is scheduled on the carrier or on the other carrier.

According to a third aspect of embodiments herein, the object is achieved by the first communication device configured to send the downlink information to the second communication device. The first communication device and the second communication device are configured to operate in the communications network. The first communication device is configured to determine whether or not the one or more third communication devices configured to operate in the communications network are sending the uplink information on the adjacent carrier. The adjacent carrier is adjacent to the carrier assigned to the first communication device for sending the downlink information to the second communication device. The first communication device is further configured to send the downlink information to the second communication device on the carrier. In order to send the downlink information, the first communication device is configured to have determined that the one or more third communication devices are not sending uplink information on the adjacent carrier to the carrier used by the first communication device for sending the downlink information.

According to a fourth aspect of embodiments herein, the object is achieved by the second communication device configured to decode the downlink data received from the first communication device. The first communication device and the second communication device are configured to operate in the communications network. The second communication device is further configured to determine whether the second communication device is scheduled on the carrier assigned to the second communication device for receiving the downlink information from the first communication device, or on the other carrier. To determine is based on whether the time-frequency resources in which the determining is configured to be performed are configured to allow the sending of uplink information, or not, on the adjacent carrier. The adjacent carrier is adjacent to the carrier wherein the sending is configured to be by the one or more third communication devices configured to operate in the communications network. The second communication device is configured to receive the downlink data from the first communication device. The second communication device is also configured to decode the received downlink data based on the determining whether the second communication device is scheduled on the carrier or on the other carrier.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the second communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the second communication device.

By the first communication device determining whether or not the one or more third communication devices are sending uplink information on the adjacent carrier before sending the downlink information, the first communication device may send the downlink information to the second communication device on the carrier as soon as, or only in the case that, it has determined that the one or more third communication devices are not sending uplink information. Hence, interference from the downlink transmission from the first communication device to the uplink transmission from the one or more third communication devices is reduced, or even avoided. Deployment of downlink-heavy configurations is therefore facilitated without disrupting the quality of communications by wireless devices in nearby areas.

BRIEF DESCRIPTION OF THE DRAWINGS

Examples of embodiments herein are described in more detail with reference to the accompanying drawings, on which.

DETAILED DESCRIPTION

Terminologies

Figure 1:
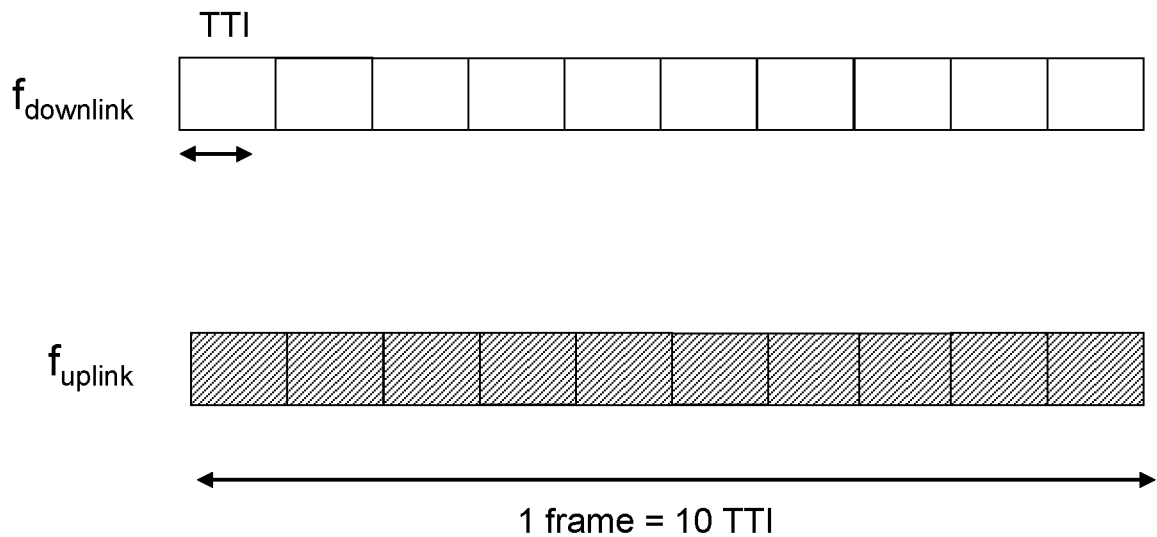
FIG. 1 is a schematic diagram illustrating an FDD time-frequency structure.
Figure 2:
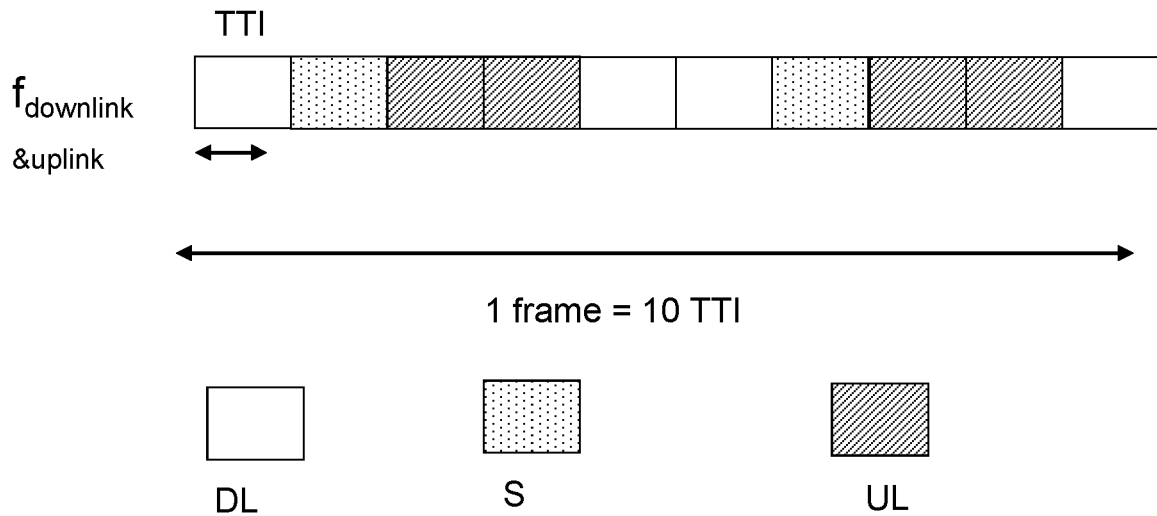
FIG. 2 is a schematic diagram illustrating a TDD time-frequency structure.

The following commonly terminologies are used in the embodiments and are elaborated below:

Radio network node: In some embodiments the non-limiting term radio network node is more commonly used and it refers to any type of network node serving a wireless device, e.g., a UE, and/or connected to other network node or network element or any radio node from where a wireless device receives a signal. Examples of radio network nodes are Base Transceiver Station (BTS), Node B, Base Station (BS), Multi-Standard Radio (MSR) radio node such as MSR BS, eNode B, network controller, Radio Network Controller (RNC), base station controller, relay, donor node controlling relay, Access Point (AP), transmission points, transmission nodes, Remote Radio Unit (RRU), Remote Radio Head (RRH), nodes in Distributed Antenna System (DAS) etc.

Network node: In some embodiments, a more general term "network node" is used and it may correspond to any type of radio network node or any network node, which communicates with at least a radio network node. Examples of network node are any radio network node stated above, core network node, e.g., MSC, Mobility Management Entity (MME) etc., Operational and Maintenance (O&M), Operational Support Systems (OSS), Self Organizing Network (SON) node, positioning node, e.g. Evolved Serving Mobile Location Centre (E-SMLC), Minimization of Drive Test (MDT) node etc.

Wireless device: In some embodiments the non-limiting term wireless device or UE is used and it refers to any type of wireless device communicating with a radio network node in a cellular or mobile communication system. Examples of wireless device are target device, device to device (D2D) mobile stations or D2D UE, machine type mobile stations or mobile stations capable of machine to machine (M2M) communication, PDA, iPad, Tablet, mobile terminals, smart phone, laptop embedded equipped (LEE), laptop mounted equipment (LME), USB dongles etc.

In some embodiments the non-limiting term user equipment (UE) is used. It refers to any type of wireless device that communicates with a radio network node in a cellular or mobile communication system. Examples of UE are target device, device to device (D2D) UE, machine type UE or UE capable of machine to machine (M2M) communication, PDA, iPad, Tablet, mobile terminals, smart phone, laptop embedded equipped (LEE), laptop mounted equipment (LME), USB dongles etc.

The embodiments are applicable to single carrier as well as to MultiCarrier (MC) or Carrier Aggregation (CA) operation of the UE. The term carrier aggregation (CA) may be also called, e.g. interchangeably called, "multi-carrier system", "multi-cell operation", "multi-carrier operation", "multi-carrier" transmission and/or reception.

Although terminology from the 3rd Generation Partnership Project (3GPP) Radio Access Network (GERAN) has been used in this disclosure to exemplify the embodiments herein, this should not be seen as limiting the scope of the embodiments herein to only the aforementioned system. Other wireless systems, including Wideband Code Division Multiple Access (WCDMA), WiMax, and Ultra Mobile Broadband (UMB) may also benefit from exploiting the ideas covered within this disclosure.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of the development of embodiments herein, a problem will first be identified and discussed.

With the introduction of additional TDD configurations, the performance of the legacy carriers on adjacent frequencies will be impacted due to the downlink only or heavy downlink interference. The normal TDD operations in the adjacent TDD frequency bands operated by another operator will be disrupted. That is, if an operator deploys a downlink only TDD configuration it has a huge impact on the uplink performance of the neighbor operator(s) due to strong downlink-to-uplink interference. This may particularly happen if the additional TDD configuration is deployed on a macro network. For example, to understand the problem, a heterogeneous deployment scenario may be considered, wherein two operators have deployed their macro nodes and low power nodes in a cell. The Operator A has deployed a macro node and is operating on frequency F1, and is using the TDD configuration 3 defined in Table 1. The operator B has deployed a macro or a pico node and is using the additional configuration, 10:0:0, or any heavy downlink configuration, for example, configuration 5 in Table 1 on an adjacent frequency F2. Without any coordination between the two operators, the downlink transmission on F2 will cause interference to the uplink transmission for the carrier F1.

Figure 4A:
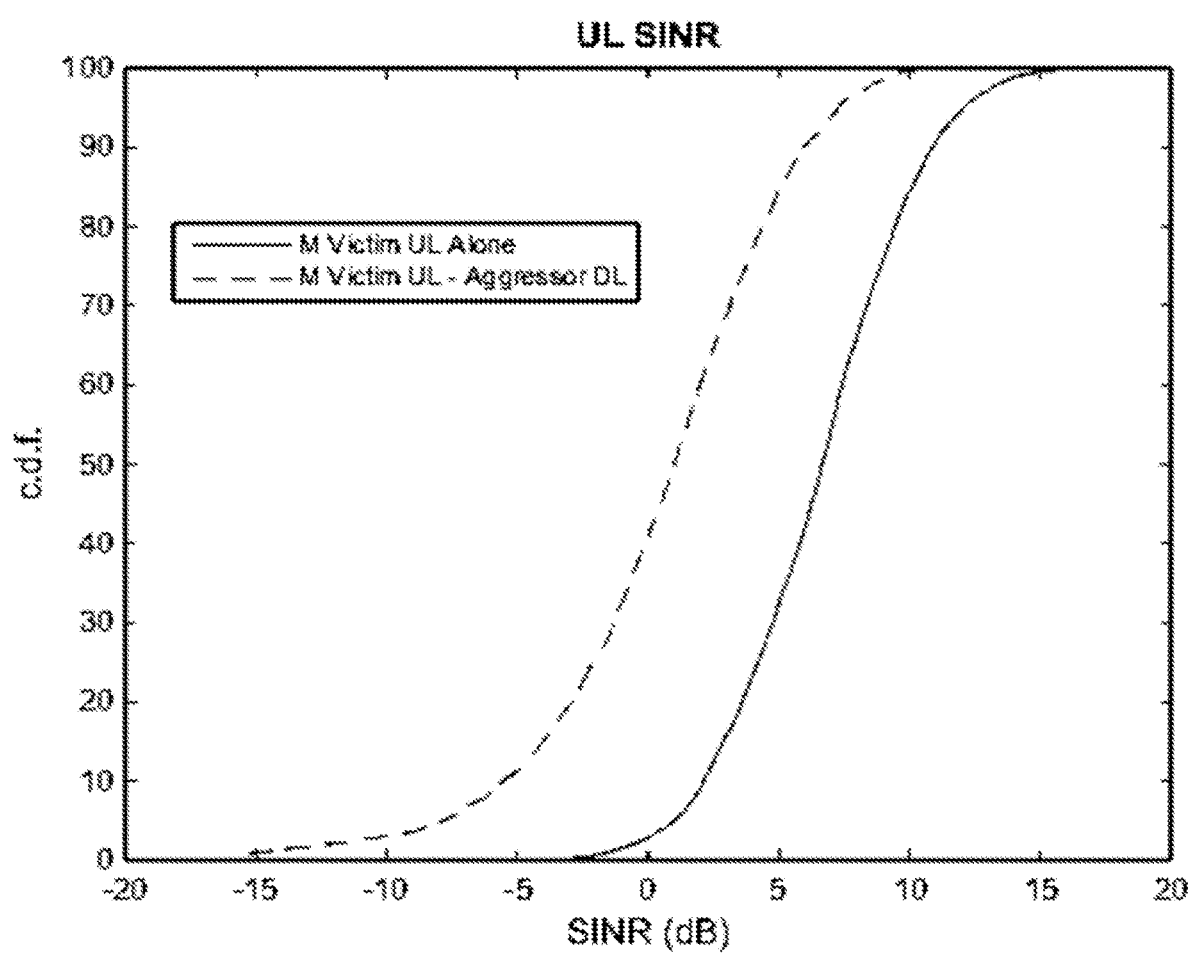
FIG. 4a is a Cumulative Distribution Function (CDF) plot for the uplink Signal to Interference Noise Ratio (SINR) on with and without adjacent channel interference in macro-pico scenario, according to existing methods.

In a first hypothetical scenario to illustrate the problem, it may be considered that the operator B is deployed as a Low Power Node (LPN). FIG. 4a is a graphical representation showing the cumulative distribution function (c.d.f.) of uplink signal to interference noise ratio (SINR), expressed in deciBels (dB), on carrier F1. The solid line represents the SINR without any interference, that is, adjacent channel interference from the LPN, and is indicated in the graph as "M Victim UL alone". The dashed line represents the SINR with interference from the LPN, indicated in the graph as "M Victim UL—Aggressor DL". A 5 dB loss may be observed in the mean SINR due to the adjacent channel interference. This reduction in the SINR translates to the reduction in link and system throughput.

Figure 4B:
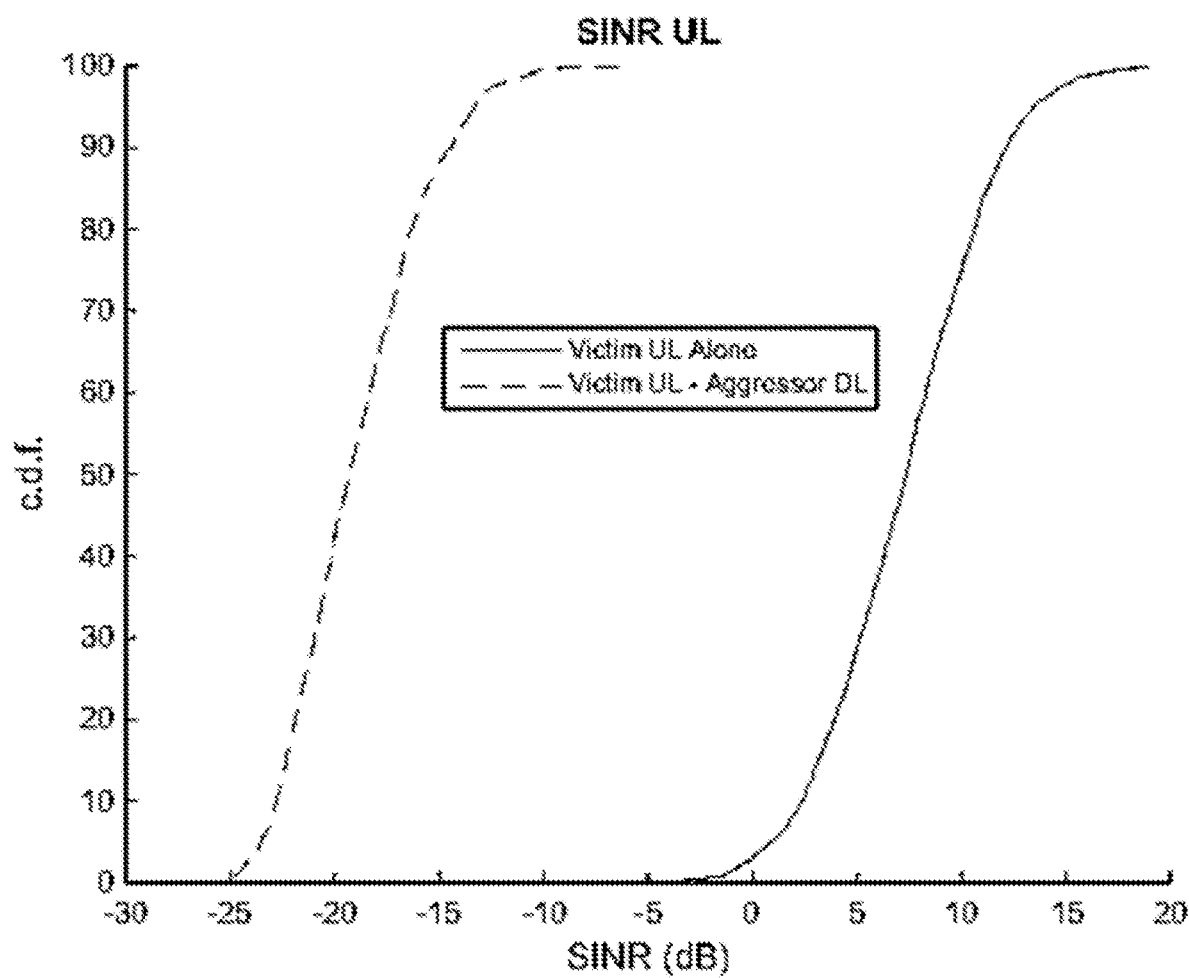
FIG. 4b is CDF plot for the uplink SINR with and without adjacent channel interference in macro-macro scenario, according to existing methods.

In a second hypothetical scenario to illustrate the problem, it may be considered that the operator B is deployed as a macro node. FIG. 4b shows the cumulative distribution function of uplink signal to noise ratio, in a similar way as FIG. 4a. The dashed line represents the SINR without any interference, that is, adjacent channel interference, from the macro node. The solid line represents the SINR with interference from the macro node. A 28 dB loss may be observed in the mean SINR due to the adjacent channel interference. This reduction in the SINR translates into a reduction in link and system throughput, and it becomes almost impossible to deploy the downlink heavy configurations on the macro node.

The problem illustrated by the example scenario just described is addressed in the present disclosure. Embodiments herein may be related to wireless communication systems and, in particular, to a method related to transmitting a downlink control channel in a TDD system. Embodiments herein may also be related to a method to transmit data in a TDD wireless communication system. Further particularly, embodiments herein may provide a method of transmitting data in a TDD wireless communication system which causes no adjacent channel interference. In the disclosed method, an aggressor Node may sense whether there is any uplink transmission on the adjacent frequencies, and transmit data to the UEs in its cell when there is no uplink transmission on the adjacent frequencies, thereby minimizing the performance loss of the other legacy systems. Embodiments herein may therefore be considered to be related to Downlink control channel, TDD, FDD, carrier aggregation, downlink only, LTE, LTE-A, PDCCH, or ePDCCH.

The term CSI-RS may be used herein for simplicity. However embodiments are applicable to any type of reference signal (aka pilot signals) or any known sequence or signals which may be transmitted in a radio resource from an antenna element belonging to any antenna system. The radio resource may be a resource element which in turn may be a time-frequency resource. The terms element, elements and antenna ports are also interchangeably used but carry the same meaning in this disclosure.

Figure 5:
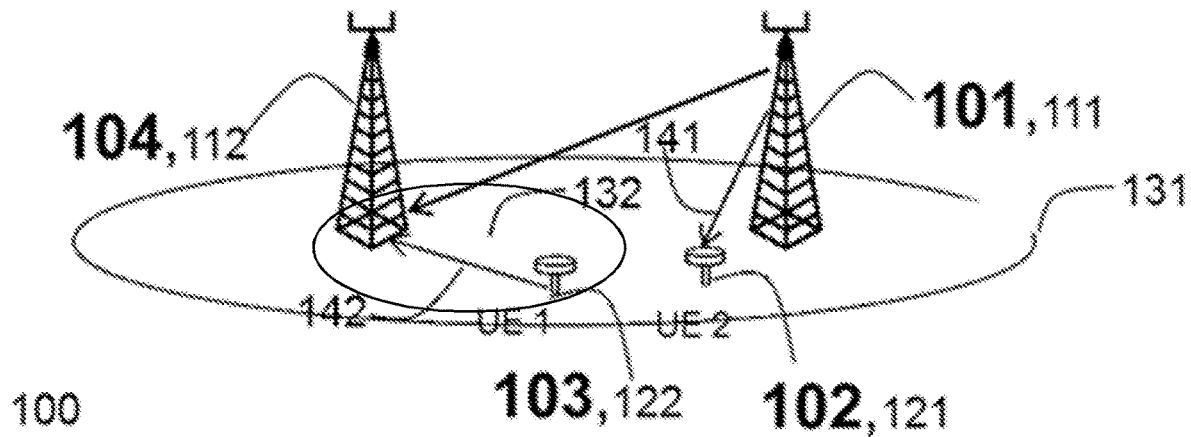
FIG. 5 is a schematic diagram illustrating an example of a communications network, according to some embodiments.

FIG. 5 depicts an example of a communications network 100, sometimes also referred to as a wireless communications network, cellular radio system, cellular network or wireless communications system, in which embodiments herein may be implemented. The communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any $3^{rd}$ Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system. The embodiments are described in particular for LTE/LTE-A. The embodiments are however applicable to any Radio Access Technology (RAT) or multi-RAT system, where a UE may operate using multiple carriers, e.g., LTE FDD/TDD, WCMDA/HSPA, Global System for Mobile communications (GSM)/GERAN, Wi Fi, Wireless Local Area Network (WLAN), WiMax, Code division multiple access 2000 (CDMA2000) etc.

The wireless communications network 100 comprises a plurality of communication devices, such as the first communication device 101, the second communication device 102, the one or more third communication devices 103, and the fourth communication device 104. Any of the first communication device 101, the second communication device 102, the one or more third communication devices 103, and the fourth communication device 104 may be a network node such as first network node 111 described below, or in some instances such as in Device to Device (D2D) communications, a wireless device such as the first wireless device 121 described below. The first communication device 101 is different than any of the second communication device 102, the one or more third communication devices 103, and the fourth communication device 104. Typically, on the DL, the first communication device 101 will be the first network node 111 and the second communication device 102 will be the wireless device 120. Also typically, the one or more third communication devices 103 may be one or more wireless devices such as the wireless device 120, which may be served by the fourth communication device 104, which may be another network node such as the network node 111. This corresponds to the non-limiting particular example illustrated in FIG. 5. In D2D communications, both of the first communication device 101 and the second communication device 102 may be different wireless devices.

The wireless communications network 100 comprises a plurality of network nodes whereof two network nodes, such as the first network node 111 and the second network node 112 are depicted in FIG. 5. Each of the first network node 111 and the second network node 112 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 5, the first network node 111 serves a first cell 131, and the second network node 112 serves a second cell 132. Each of the first network node 111 and the second network node 112 may be of different classes, such as, e.g., macro eNodeB, home eNodeB or pico base station, based on transmission power and thereby also cell size. The first communication device 101 may typically be a macro network node. The fourth communication device 104 may be another macro network node, as illustrated in FIG. 5, or a pico network node. Also typically, the wireless communications network 100 may comprise more cells similar to the first cell 131 and the second cell 132, served by their respective network node. This is not depicted in FIG. 5 for the sake of simplicity. Each of the first network node 111 and the second network node 112 may support one or several communication technologies, and its name may depend on the technology and terminology used. In 3GPP LTE, each of the first network node 111 and the second network node 111, which may be referred to as eNodeBs or even eNBs, may be directly connected to one or more core networks.

The wireless communications network 100 comprises a plurality of wireless devices whereof two wireless devices, such as the first wireless device 121 and the second wireless device 122 are depicted in FIG. 5. Each of the first wireless device 121 and the second wireless device 122, also referred to herein as a user equipment or UE, are located in the wireless communication network 100. Each of the first wireless device 121 and the second wireless device 122 may e.g. be a user equipment, a mobile terminal or a wireless terminal, a mobile phone, a computer such as e.g. a laptop, a Personal Digital Assistants (PDAs) or a tablet computer, sometimes referred to as a surf plate or tablet, with wireless capability, or any other radio network units capable to communicate over a radio link in a wireless communications network. Please note the term user equipment used in this document also covers other wireless devices such as Machine to machine (M2M) devices, even though they may not have any user.

The first communication device 101 may communicate with the second communication device 102 over a first radio link in the first cell 131, e.g., a primary cell, or a carrier 141. The carrier 141 may also be referred to herein as a "component carrier". In some embodiments, as will be described later, the first communication device 101 may communicate with the second communication device 102 over a so called "cross carrier", which may be understood as another carrier used with cross-carrier scheduling. In the non-limiting example of FIG. 5, only one arrow for the carrier 141 and the cross carrier is depicted. In other depictions, each of component carrier and the cross carrier may be represented by a different arrow. The component carrier may be understood as a first frequency, or first frequency range, and the cross carrier may be understood as a second frequency, or a second frequency range, the cross carrier being different than the component carrier. In some embodiments, the carrier 141 is a downlink, non-standalone carrier. To simplify the description, any reference herein to "a carrier 141" or "the carrier 141", unless otherwise qualified, may be understood to refer only to the component carrier. Similarly, any reference herein to "another carrier" or "the other carrier", unless otherwise qualified, may be understood to refer only to the cross carrier. The one or more second communication devices 103 may communicate with the fourth communication device 102, e.g., in the uplink, over a second radio link or an adjacent carrier 142, the adjacent carrier being adjacent to the carrier 141. Adjacent may be understood herein as being within a distance of a certain range of frequencies, such that the adjacent carrier 142 may be subject to interference by transmission on the carrier 141. The distance of the certain range of frequencies may be determined by an operator of the communications network 100, e.g., by empirical methods. As a non-limiting example, adjacent may be understood to refer to being within a distance of 20 megahertz (MHz). It may be understood that the adjacent carrier 142 may be not exactly juxtaposed to the carrier 141, but e.g., a certain frequency range or guard period may be in between. For example, in LTE, ~5% of the subcarriers at the edge of any carrier may not be used, which may create a type of guard band.

In other examples than those depicted in FIG. 5, wherein the communications network 100 is a cellular system, the first network node 111, or the second network node 112, may serve more cells. In other examples than those depicted in FIG. 5, wherein the communications network 100 is a non-cellular system, the first network node 111, or the second network node 112, may serve receiving nodes with serving beams.

Any of the first communication device 101 and the second communication device 102 described above may be implemented in a so-called cloud solution, referring to that the implementation may be distributed, and any of the first communication device 101 and the second communication device 102 and indexing server therefore may be so-called virtual nodes or virtual machines. This may similarly apply to any of the one or more third communication devices 103 and the fourth communication device 104.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Several embodiments are comprised herein. More specifically, the following are embodiments related to the first communication device 101, e.g., a transmitting device, and embodiments related to the second communication device 102, e.g., a receiving device related embodiments.

Figure 6:
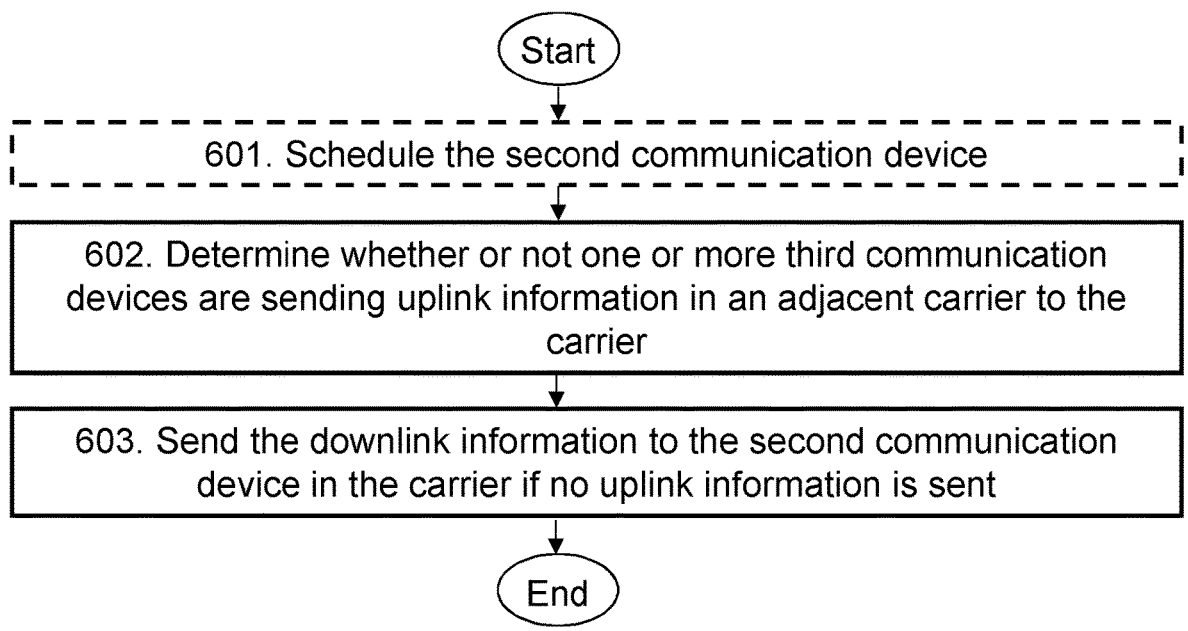
FIG. 6 is a schematic diagram illustrating actions of an example of a method in a first communication device, according to some embodiments.

Embodiments of a method performed by the first communication device 101 for sending downlink information, e.g. a message, to the second communication device 102, will now be described with reference to the flowchart depicted in FIG. 6. As mentioned earlier, the first communication device 101 and the second communication device 102 operate in the communications network 100, e.g. a wireless communications network. In some embodiments, the first communication device 101 is the network node 111, e.g., an eNB, and the second communication device 102 is the wireless device 120, e.g., a UE, being served by the first communication device 101.

The method may comprise one or more of the following actions. In some embodiments all the actions may be performed. In some embodiments, one or more actions may be performed. One or more embodiments may be combined, where applicable. All possible combinations are not described to simplify the description. In FIG. 6, optional actions are indicated with dashed lines.

Action 601

In some particular embodiments, this action 601 is related to a method at the first communication device 101, e.g., the network node 111, for transmitting downlink data. In the normal course of communications in the communications network 100, the first communication device 101, e.g., the network node 111, may need to send downlink information, such as data, to the second communication device 102, e.g., the wireless device 120. In the communications network 100, the carrier 141 is assigned to the first communication device 101 for sending the downlink information to the second communication device 102. The downlink information may be downlink control information or data. In LTE, the downlink information may be e.g., information in a PDSCH, such as data, and/or downlink control information in a PDCCH.

Figure 3:
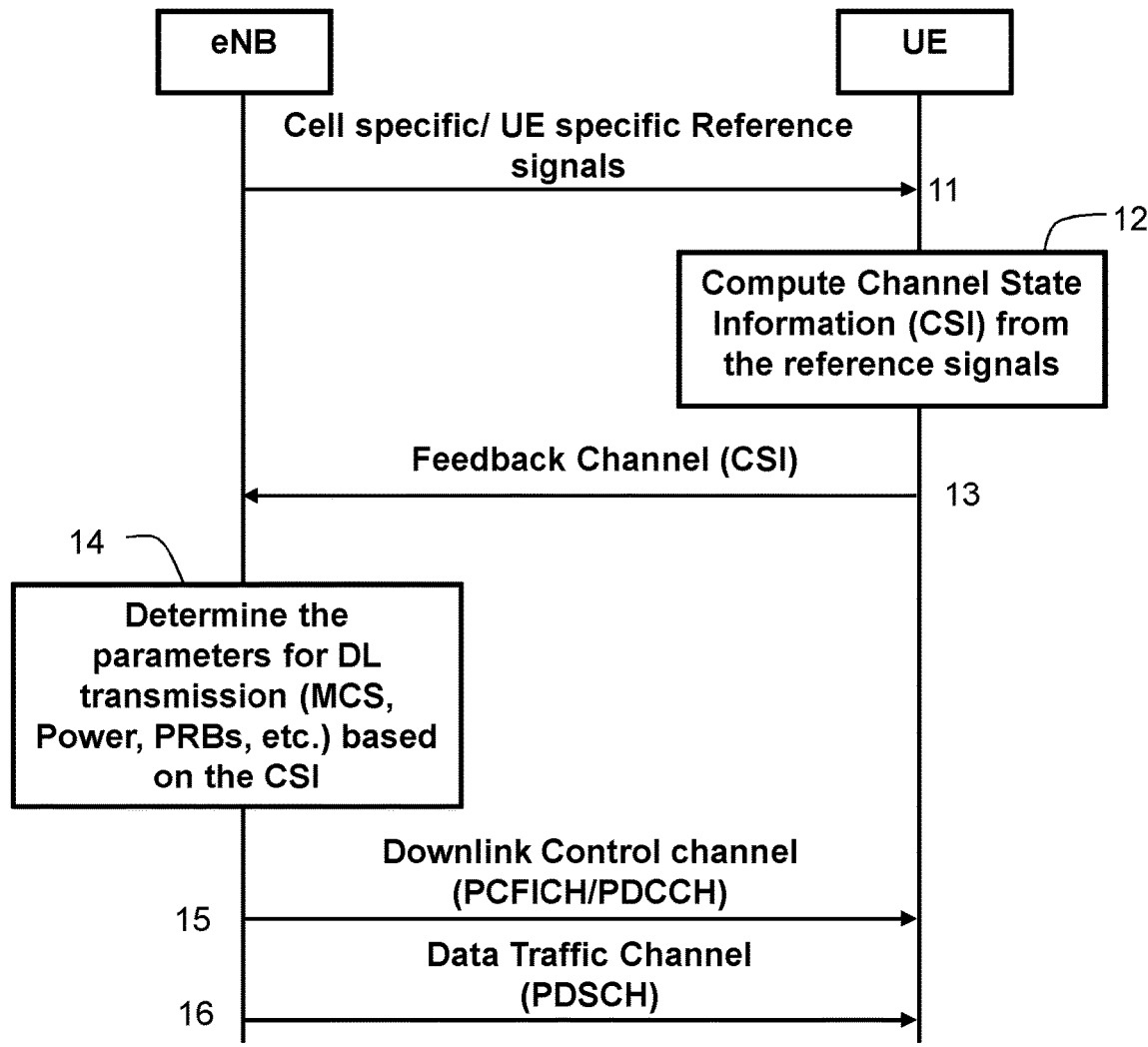
FIG. 3 is a schematic diagram illustrating a message sequence chart between an eNode B and a UE.

For the purpose of sending downlink information, e.g., data, to the second communication device 102, the first communication device 101, may, in this Action, schedule the second communication device 102. Scheduling may be understood as determining information to control or manage when and how, e.g., at what data rate, transmissions to and from the second communication device 102 may be performed. In some embodiments, the scheduling may also comprise sending to the second communication device 102 the determined information to control or manage when and how transmissions to and from the second communication device 102 may be performed For example, in the case of LTE, scheduling may be performed by sending downlink control information, as described in the background section of this application, e.g., in relation to FIG. 3.

As part of the scheduling, the first communication device 101 may decide to schedule the second communication device 102 in a particular set of time-frequency resources, e.g., in LTE, this may be a set of OFDM symbols, or a particular subframe.

According to embodiments herein, and in order to avoid causing interference to the one or more third communication devices 103, which may be transmitting nearby, e.g., at low power, the first communication device 101 may sense if there is any uplink transmission from the one or more third communication devices 103 in the adjacent carrier 142. If there is uplink transmission, the first communication device 101 may then refrain from proceeding with the transmission of data, that is, backoff. In order to be able to conduct the sensing prior to the transmission of the data, the first communication device 101 may need to first free-up time-frequency resources on the carrier 141 to allow for the sensing to occur. Since the downlink control information may be typically sent on the carrier 141 before the data, the first communication device 101 may, in some embodiments, for sending the downlink information to the second communication device 102, wherein the downlink information is data, schedule the second communication device 102 using cross carrier scheduling. This may be performed by the first communication device 101 by sending the downlink control information of the carrier 141 on another carrier, that is, the cross carrier described earlier. The downlink control information may be, e.g., in LTE, the PDCCH.

In certain time-frequency resources, e.g., in certain subframes, sending of uplink information may not be allowed. That is, the time-frequency resources may be configured for downlink only transmission, whereas others, may be configured for sending of uplink information. Taking LTE as an example, this may be observed for certain configurations. As may be seen in Table 1, uplink transmission is possible only in few sub frames. For example, subframes 0, 5 and 1, this last one in a partial way, may always be used for downlink. Subframe 1 is a special subframe (S), which may contain both, downlink and uplink transmission. In some embodiments, the first communication device 101 and the second communication device 102 may operate in the communications network 100 with a first Time Division Duplex, TDD, configuration, and the one or more third communication devices 103 may operate in the communications network 100 with a second TDD configuration, which first TDD configuration may be different than the second TDD configuration. Since the second TDD configuration may be different than the first TDD configuration, uplink transmissions from the one or more third communication devices 103 may be allowed when downlink transmissions from the first communication device 101 may be allowed, and therefore the latter may interfere on the former. However, there may be intervals of time, e.g., TTIs, wherein transmission of uplink information by the one or more third communication devices 103 is not allowed, hence, the first communication device 101 may not need to check for uplink transmissions, since they may not occur anyway. Therefore, for sending the downlink information to the second communication device 102 wherein the downlink information is data, in some embodiments when the second communication device 102 may be scheduled in time-frequency resources wherein the sending of uplink information, by the one or more third communication devices 103, is not allowed, the first communication device 101 may schedule the second communication device 102 using component carrier 141 scheduling, wherein the sending the downlink control information to the second communication device 102 may be performed on the carrier 141.

Conversely, when the second communication device 102 may be scheduled in time-frequency resources wherein the sending of uplink information is allowed, by the one or more third communication devices 103, the sending the downlink control information to the second communication device 102 may be performed by the first communication device 101 on the other carrier, e.g., using cross carrier scheduling, since the sensing may be required.

As explained earlier whether the sending of uplink information by the one or more third communication device 103 is allowed or not may be understood to be based, in some embodiments on whether the time-frequency resources are configured for the sending of uplink information or not, respectively.

Action 602

In order to avoid causing interference to the one or more third communication devices 103 which may be transmitting nearby, in this Action, the first communication device 101 determines whether or not the one or more third communication devices 103 e.g., one wireless device such as the wireless device 120, operating in the communications network 100 are sending uplink information, e.g., to the fourth communication device 104, on the adjacent carrier 142. The adjacent carrier 142 is one of the one or more adjacent carriers to the carrier 141 to be used by the first communication device 101 for sending the downlink information to the second communication device 102. A carrier herein may be e.g., a radio frequency carrier. According to this Action, the first communication device 101 may sense if a received signal is an uplink signal, e.g., an uplink LTE signal, or not. This may require an uplink receiver and a conventional uplink receiver may be used for this purpose. This may be done in several ways, e.g., by simple energy detection: whenever the first communication device 101 detects signals above a certain energy level in an uplink subframe, it may assume that uplink communication is ongoing on the adjacent carrier 142. Alternatively, the first communication device 101 may try to detect the content of the signals, e.g., by detecting reference signals. This may allow the first communication device 101 to detect whether the signal is uplink or downlink, without needing to know the TDD configuration of the one or more third communication devices 103.

If the first communication device 101 determines that there is an uplink transmission, then it may back off from transmitting the data to the second communication device 102, thereby minimizing, or even nullifying, the interference from the first communication device 101 to the fourth communication device 104.

The determining whether or not the one or more third communication devices 103 are sending uplink information may be understood to be performed in time-frequency resources. For example, in some embodiments wherein the communications network 100 is an LTE network, the time-frequency resources may be a first three Orthogonal Frequency Division Multiplexing symbols in a subframe. However, the time-frequency resources may also be understood as subframes.

As explained earlier, the first communication device 101 may not need to check for uplink transmissions in the time-frequency resources wherein uplink transmission is not allowed anyway. Therefore, in some embodiments, the determining whether or not the one or more third communication devices 103 are sending uplink information is based on whether the time-frequency resources wherein the determining is performed are configured for the sending of uplink information or not. In some embodiments, the determining whether or not one or more third communication devices 103 are sending uplink information may be only performed in time-frequency resources wherein sending of uplink information is allowed, that is in time-frequency resources configured for sending uplink information. Taking LTE as an example, and in reference to the configurations of Table 1, in some embodiments, the determining whether or not the one or more third communication devices 103 are sending uplink information may be only performed in subframes 2, 3, 4, 6, 7, 8, and 9. As explained earlier, there subframes are configured to allow uplink transmissions. Similarly, the first communication device 101 may skip determining whether or not the one or more third communication devices 103 are sending uplink information in subframes 0, 1 and 5, as uplink transmissions are not allowed in these subframes anyway.

Action 603

In this Action, the first communication device 101 sends the downlink information to the second communication device 102 on the carrier 141, wherein the first communication device 101 has determined that the one or more third communication devices 103 are not sending uplink information on the adjacent carrier 142 to the carrier 141 used by the first communication device 101 for sending the downlink information.

The downlink information may be, e.g., in LTE, e.g., information in a PDSCH, such as data, and/or downlink information in a PDCCH.

As has been explained above, there may be instances wherein the first communication device 101 may send the downlink control information, e.g., the PDCCH, using cross carrier scheduling, but may back off from transmitting the data, e.g., the PDSCH. In these cases, the second communication device 102 may send a HARQ-NAK as it did not receive any PDSCH data, which may be meaningful. Once the first communication device 101 receives this HARQ-NAK, it may discard the NAK, and reschedule the packet with the same redundancy version as that of old attempt. In an example, the scheduling parameters may be same as that of an old attempt. This may reduce the computational effort of re-computing all the scheduling parameters. In another example, the first communication device 101 may compute the scheduling parameters again based on the latest channel state information. However, in both cases, the redundancy version and HARQ process identifier (ID) may be same to get the HARQ gain, both chase combing and Incremental redundancy, at the receiver.

According to the foregoing, some examples of embodiments herein may relate to a method at the first communication device 101, e.g., the network node 111, for handling or interpreting the HARQ-ACK received from the second communication device 102. Some examples may relate to a method wherein the back off data may be retransmitted in another time interval with the same scheduling parameters as a previous attempt. In other examples of embodiments herein may relate to a method wherein the back off data is retransmitted in another time interval with the different scheduling parameters from old attempt, but with the same redundancy version and HARQ process identifier.

To summarize the method just described in other terms, the method herein may be understood to relate to a method in a transmission node to check if there is any uplink transmission on the adjacent carriers and back off from transmission of data if there is any transmission in the uplink. In some embodiments of this method, the downlink control information of the said carrier 141 may be sent on another carrier using cross carrier scheduling.

Figure 7:
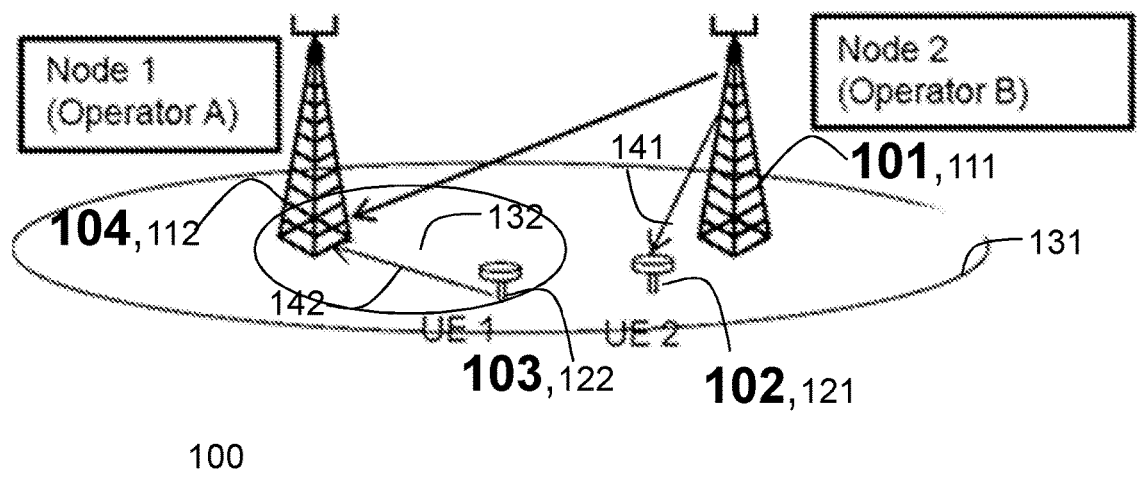
FIG. 7 is a schematic diagram illustrating an example of a deployment of the communications network, according to some embodiments.

The method performed by the first communication device 101 will now be illustrated with an example wherein the communications network 100 is an LTE network. FIG. 7 shows a non-limiting deployment scenario of the communications network 100 considered for an example of embodiments herein. A first operator, Operator A, is deploying a TDD configuration on the first communication device 101, an eNode B which may be a macro or LPN, on frequency F1. The first communication device 101 is depicted in the Figure as Node 2. A second operator, Operator B, is deploying another TDD configuration different from Operator A on the fourth communication device 104, another eNode B, which may be a macro or a LPN, on frequency F2. The fourth communication device 104 is depicted in the Figure as Node 1. F1 and F2 are adjacent to each other. Since both the operators are using different TDD configurations, the downlink transmission from Operator B interferes with the uplink reception of Operator A, as represented by the bold arrow from the first communication device 101 to the second communication device 102.

Figure 8:
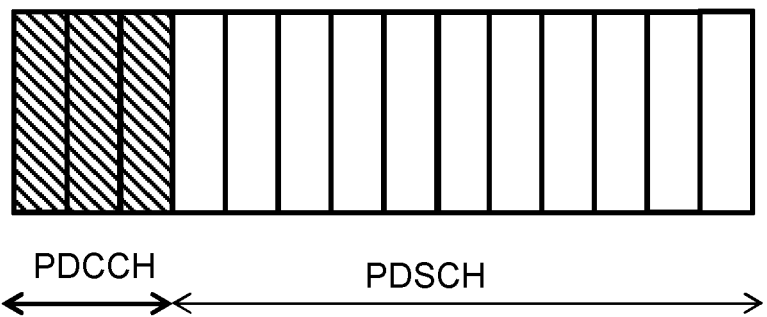
FIG. 8 is a schematic diagram illustrating a conventional method for transmitting downlink information according to existing methods.

As an example, the Node 2, in accordance with Action 601, decides to schedule the second communication device 102, denoted in the Figure as UE2, in a kth TTI in the downlink direction. Hence, according to the background section entitled "Message sequence chart of downlink transmission", the Node 2 may need to send PDCCH and PDSCH in $k^{th}$ TTI. In general, in conventional methods, the first 3 OFDM symbols of the subframe are used for PDCCH and the remaining symbols are used to for PDSCH as shown in FIG. 8. FIG. 8 is a schematic diagram illustrating a conventional method for transmitting downlink information according to existing methods. Each OFDM symbol is represented by a block. The first three OFDM symbols are illustrated with striped blocks.

Figure 9:
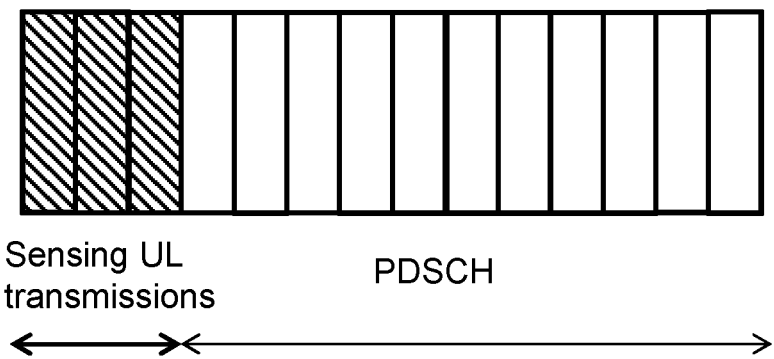
FIG. 9 is a schematic diagram illustrating a method for transmitting downlink information, according to some embodiments.
Figure 10:
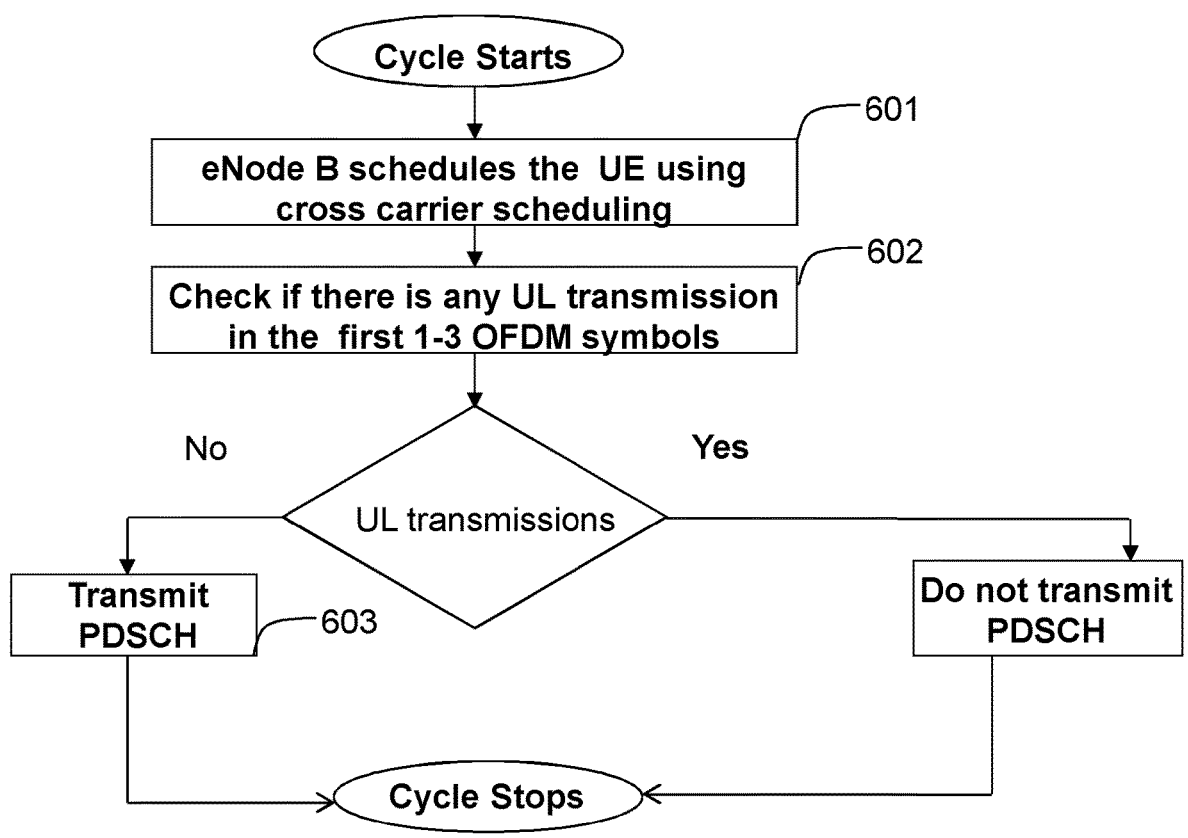
FIG. 10 is a flowchart illustrating an example of a method in a first communication device, according to some embodiments.

However, for some embodiments herein, the node 2 may need to sense if there is any uplink transmission from the other nodes, the one or more third communication devices 103. Therefore, the node 2 may not send any information on the first 3 OFDM, symbols. Instead, according to examples herein, the Node 2 sends the PDCCH for the UE2 on another carrier using cross carrier scheduling according to Action 601, and frees up these 3 OFDM symbols for sensing the uplink transmissions, as shown in FIG. 9 and in the flowchart of FIG. 10. Hence, in the first 3 OFDM symbols, the Node 2 may determine if the received signal is an LTE uplink signal or not according to Action 602. If the Node 2 determines that there is an uplink transmission, then it backs off from transmitting PDSCH to the UE2, thereby minimizing, or even nullifying, the interference from Node 2 to Node 1. If however, the Node 2 determines that there are no UL transmissions from the one or more third communication devices 103, it may transmit the PDSCH to the UE2, according to Action 603. The first communication device 101, the aggressor node, may therefore listen during the first 3 OFDM symbols to determine whether there is any uplink transmission, and transmit to the second communication device 102 if there is no activity on the adjacent carrier 142. In the first case, wherein the Node 2 backs off, since no data is sent, the UE2 may send a Negative ACKnowledgement (NAK) in its HARQ-ACK report. Since node 2 knows that no data is transmitted it may discard the NAK and try to send the data in the next scheduling interval, after a minimum of 1 TTI. If the Node 2 senses that there is no uplink transmission to the other nodes, the one or more third communication devices 103, it may send the PDSCH to the UE2.

Figure 11:
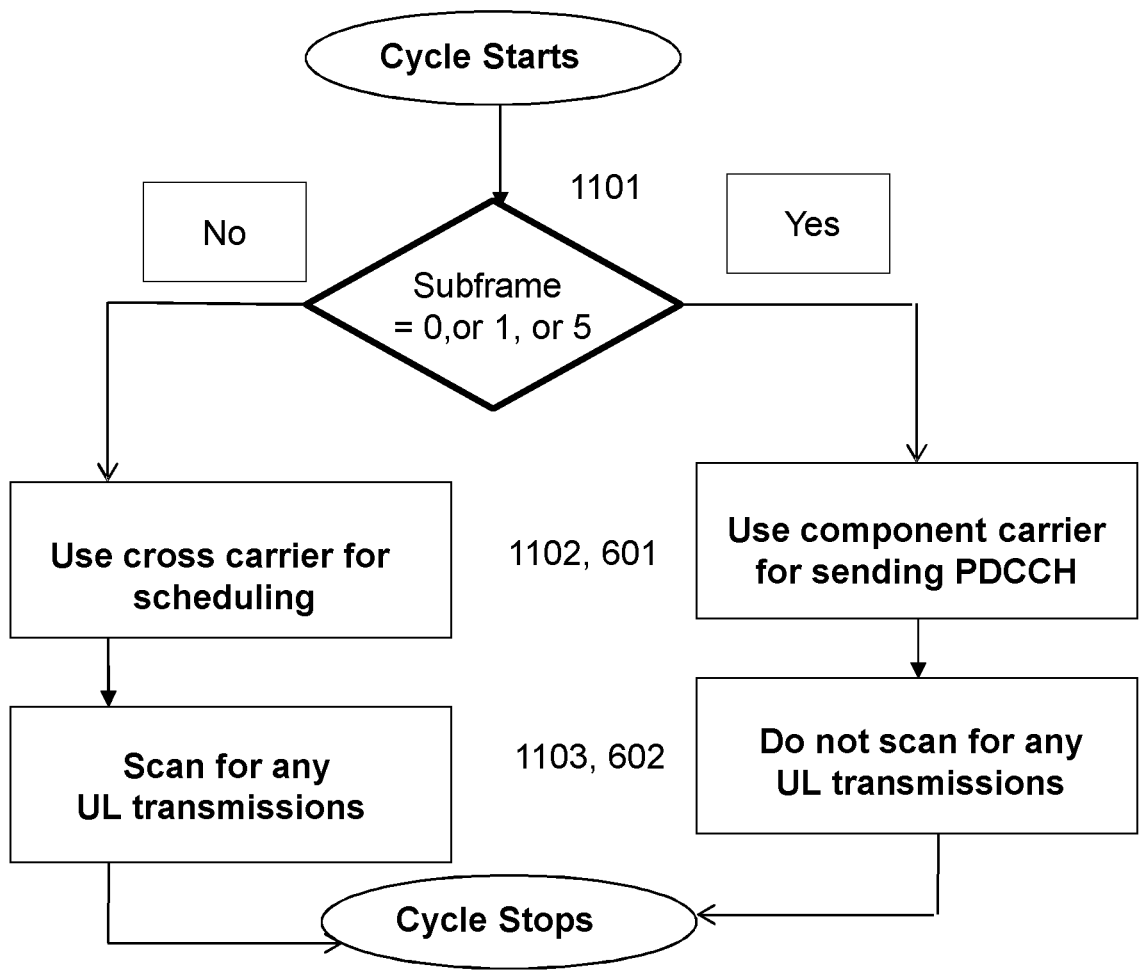
FIG. 11 is a flowchart illustrating an example of a method in a first communication device, according to some embodiments.

FIG. 11 is a flowchart illustrating another example of the method at the Network Node, e.g., the first communication device 101, for transmitting downlink data, wherein the communications network 100 is an LTE-TDD network. As explained in Action 601, for some embodiments herein, the first communication device 101 may need to use cross carrier scheduling. However, by looking at Table 1, uplink transmission is possible only in few sub frames. For example, subframes 0, 5 and 1, partial, are always used for downlink. Hence in these TTIs, the first communication device 101 may send PDCCH using component carrier scheduling and may switch off the sensing receiver for checking any uplink transmissions. As shown in FIG. 11 in Action 1101, the first communication device 101, in some embodiments, may first determine if the time-frequency resources used for the determining whether or not the one or more third communication devices 103 are sending uplink information according to Action 602, are configured for the sending of uplink information or not. In this non-limiting example, the first communication device 101 determines if the subframe used for performing Action 602 is one of 0, 1, or 5, which are only used for downlink transmission. At 1102, if the subframe is none of 0, 1, or 5, and therefore uplink transmissions are allowed, the first communication device 101 may use the cross carrier for scheduling the second communication device 102 according to Action 601. Then, at 1103, the first communication device 101 may scan for any uplink transmissions according to Action 602. If the first communication device 101 determines that the subframe used for performing Action 602 is one of 0, 1, or 5, and therefore uplink transmissions are not allowed, the first communication device 101 may use the carrier 141 for scheduling the second communication device 102 according to Action 601, and the first communication device 101 may skip scanning for any uplink transmissions.

According to the foregoing, an example of embodiments herein is a method in the network node 111, where the cross carrier scheduling is used only in subframe 2, 3, 4, 6, 7, 8 and 9. Another example of embodiments herein is a method in the network node 111 according to the Actions of FIG. 6, where the component carrier scheduling is used only in subframes 0, 1, and 5. Another further example of embodiments herein is a method in the network node 111 according to the Actions of FIG. 6, where the network node searches for any uplink transmission only in subframes 2, 3, 4, 6, 7, 8 and 9. Yet another example of embodiments herein is a method in the network node 111 according to the foregoing, where the network node does not searches for any uplink transmission only in subframes 0, 1, and 5.

In some particular examples, the method may comprise that the first network node 101 may use a listen before talk (LBT) type of mechanism when an additional TDD configuration is deployed. An advantage of embodiments herein is that the performance loss of the legacy systems is minimized, and at the same time the deployment of downlink heavy TDD configurations is facilitated. Methods herein therefore mitigate the drawbacks of deploying additional TDD configuration.

It may be noted that while the first communication device 101 may transmit other common channels which may interfere with the uplink reception of the neighbor frequencies although the PDSCH may be muted. However, it may be noted that the power to the common control channels, such as Cell-specific Reference Signal (CRS), may typically be very low compared to the PDSCH. This implies that the power amplifier may be operating in the linear region. Hence in these cases, the Adjacent Channel Interference Ratio (ACIR) may generally be high and the impact to the neighbor uplink transmissions may be very minimal. Hence, this method may perform well, even when the first communication device 101 may be a DL-only TDD eNode B which transmits only common channels.

Finally, it may be noted that the co-existence issue may not occur if the operators on adjacent carriers are both using the downlink-only configuration.

Figure 12:
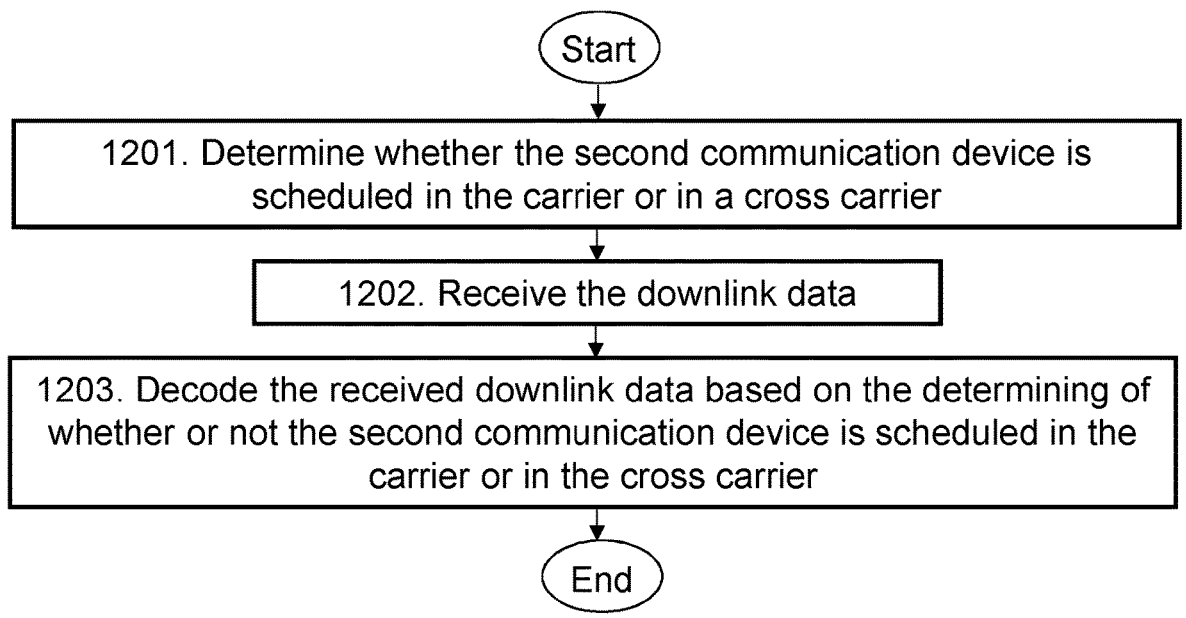
FIG. 12 is a schematic diagram illustrating actions of an example of a method in a second communication device, according to some embodiments.

Embodiments of a method performed by the second communication device 102 for decoding downlink data received from the first communication device 101, will now be described with reference to the flowchart depicted depicted in FIG. 12. As stated earlier, the first communication device 101 and the second communication device 102 operate in the communications network 100.

The detailed description of some of the following corresponds to the same references provided above, in relation to the actions described for the first communication device 101, and will thus not be repeated here.

The method may comprise one or more of the following actions. In some embodiments all the actions may be performed. In some embodiments, one or more actions may be performed. One or more embodiments may be combined, where applicable. All possible combinations are not described to simplify the description.

Action 1201

In some particular embodiments, embodiments herein are therefore related to a method at the second communication device 102, e.g., a UE, for receiving the downlink data. As explained in the background section entitled "Message Sequence Chart of Downlink Transmission", the second communication device 102 may need to check the downlink control information, e.g., the PDCCH, before decoding the data, e.g., the PDSCH. Also as explained earlier, for some embodiments herein, the first communication device 101 may need to use cross carrier scheduling to send the downlink control information. Accordingly, the second communication device 102 receiving the downlink data from the first communication device 101 may check the cross carrier 142, for example a primary carrier, PDCCH, and may then decide if the data is scheduled for it or not. Accordingly, in this Action, the second communication device 102 may determine whether the second communication device 102 is scheduled on the carrier 141 assigned to the first communication device 101 for sending the downlink information to the second communication device 102, or on another carrier, that is, the other carrier. In other words, the second communication device 102 may determine whether or not the data for the second communication device 102 is scheduled in the carrier 141 or in the other, cross, carrier, e.g., based on the received downlink control information, e.g., based on the PDCCH. Typically, this may be done by a Cyclic Redundancy Check (CRC) of the PDCCH symbols.

However, the first communication device 101 may only send the downlink control information the other carrier using in e.g., subframes where the sensing of uplink transmissions may be required. Therefore, in some time-frequency resources, e.g., frames, the second communication device 102 may skip monitoring the other carrier, since it may not expect the downlink control information on it anyway. The determining in this Action is therefore based on whether time-frequency resources in which the determining 1201 is performed are configured to allow sending of uplink information, or not, on the adjacent carrier 142 to the carrier 141. The sending is by the one or more third communication devices 103 operating in the communications network 100. As explained earlier, in a particular example in LTE, this Action may be implemented by determining if the time-frequency resources are the subframes 0, 1, or 5, or not. Since in these subframes, uplink transmission is not allowed, that is, they are configured for downlink only, the second communication device 102 may determine that it is scheduled on the carrier 141. This is because in these subframes, the first communication device 101, may not need to scan for uplink transmissions, and may therefore schedule the second communication device 102 on the carrier 141.

In some examples of Action 1201, embodiments herein may relate to a method in the second communication device 102 for decoding downlink control information, e.g., the PDCCH, on the other carrier, a primary carrier, in subframes 2, 3, 4, 6, 7, 8 and 9.

In some examples of Action 1201, embodiments herein may relate to a method in the second communication device 102 for decoding downlink control information, e.g., the PDCCH, on the carrier 141, the component carrier, in subframes 0, 1, and 5.

Action 1202

In this Action, the second communication device 102 receives the downlink data from the first communication device 101. The data may be received when the first communication device 101 has determined that the one or more third communication devices 103 are not sending uplink information in the adjacent carrier 142. The adjacent carrier 142 may be one of the one or more adjacent carriers to the carrier 141 used by the first communication device 102 for sending the downlink information.

The second communication device 102 may receive the downlink data in the carrier 141 or in the other carrier.

Action 1203

In this Action, the second communication device 102 may decode the received downlink information based on the determining whether or not the second communication device 102 is scheduled on the carrier 141 or on the other carrier.

Embodiments on Action 1203 may then be related to decoding a data channel, e.g., the PDSCH, received from the first communication device 101, based on the determining of whether or not the second communication device 102 is scheduled in the carrier 141 or in the other, cross, carrier e.g., based on the PDCCH. If e.g., as a result of Action 1201, the second communication device 102 decides that it is scheduled on a secondary carrier, it may use the scheduling information to decode the data, e.g., the PDSCH, on the secondary carrier.

If the PDSCH transmission is a pass, then second communication device 102 may send a HARQ-ACK, and if a CRC for the PDSCH is a fail, then it may send a HARQ-NAK. However, there may be instances when the first communication device 101 may send the PDCCH for the intended UE, but may have not sent the PDSCH on the secondary carrier to avoid the interference to the adjacent carrier 142, or adjacent channel, to uplink transmissions from the one or more third communication devices 103. In these cases, the second communication device 102 may send a NAK, as the CRC anyhow will fail.

According to the foregoing, some examples embodiments herein may relate to a method whereby the second communication device 102 may communicate HARQ-NAK to the first communication device 101 when it decodes the PDCCH successfully, but the PDSCH a failure.

To perform the method actions described above in relation to FIGS. 6, 9, 10 and 11, the first communication device 101 is configured to send the downlink information to the second communication device 102. The first communication device 101 may comprise the following arrangement depicted in FIG. 13. The first communication device 101 and the second communication device 102 are configured to operate in the communications network 100.

The detailed description of some of the following corresponds to the same references provided above, in relation to the actions described for the first communication device 101, and will thus not be repeated here. For example, in some embodiments, the first communication device 101 and the second communication device 102 may be configured to operate in the communications network 100 with a first TDD configuration, and the one or more third communication devices 103 may be configured to operate in the communications network 100 with a second TDD configuration, which first TDD configuration may be different than the second TDD configuration.

The first communication device 101 is further configured to, e.g., by means of a determining module 1301 configured to, determine whether or not the one or more third communication devices 103 configured to operate in the communications network 100 are sending uplink information on the adjacent carrier 142, wherein the adjacent carrier 142 is adjacent to the carrier 141 assigned to the first communication device 101 for sending the downlink information to the second communication device 102.

The determining module 1301 may be a processor 1302 of the first communication device 101, or an application running on such processor.

To determine whether or not the one or more third communication devices 103 are sending uplink information may be configured to be performed in time-frequency resources, and may be configured to be based on whether the time-frequency resources are configured for the sending of uplink information or not.

The time-frequency resources may be the first three Orthogonal Frequency Division Multiplexing symbols in a subframe.

In some embodiments, to determine whether or not the one or more third communication devices 103 are sending uplink information is only configured to be performed in subframes 2, 3, 4, 6, 7, 8, and 9

The first communication device 101 may be further configured to, e.g., by means of a sending module 1303 configured to, send the downlink information to the second communication device 102 on the carrier 141, wherein the first communication device 101 is configured to have determined that the one or more third communication devices 103 are not sending uplink information on the adjacent carrier 142 to the carrier 141 used by the first communication device 101 for sending the downlink information. The sending module 1303 may be the processor 1302 of the first communication device 101, or an application running on such processor.

In some embodiments, wherein the downlink information is data, the first communication device 101, to send the downlink information to the second communication device 102, may be further configured to, e.g., by means of a scheduling module 1304 configured to, schedule the second communication device 102 using cross carrier 141 scheduling, by being configured to send the downlink control information of the carrier 141 on another carrier, that is the other carrier. The scheduling module 1304 may be the processor 1302 of the first communication device 101, or an application running on such processor.

In some embodiments, to send the downlink control information to the second communication device 102 may be configured to be performed by the first communication device 101 on the other carrier when the second communication device 102 is scheduled in time-frequency resources wherein the sending of uplink information is configured to be allowed.

In some embodiments, wherein the downlink information is data, the first communication device 101, to send the downlink information to the second communication device 102, may be further configured to, e.g., by means of the scheduling module 1304 configured to, schedule the second communication device 102 using component carrier 141 scheduling, wherein to send the downlink control information to the second communication device 102 may be configured to be performed on the carrier 141, when the second communication device 102 is scheduled in time-frequency resources wherein the sending of uplink information is configured to not be allowed.

The first communication device 101 may be configured to perform other actions with other modules 1305 configured to perform these actions within the first communication device 101. Each of the other modules 1305 may be the processor 1302 of the first communication device 101, or an application running on such processor.

Figure 13:
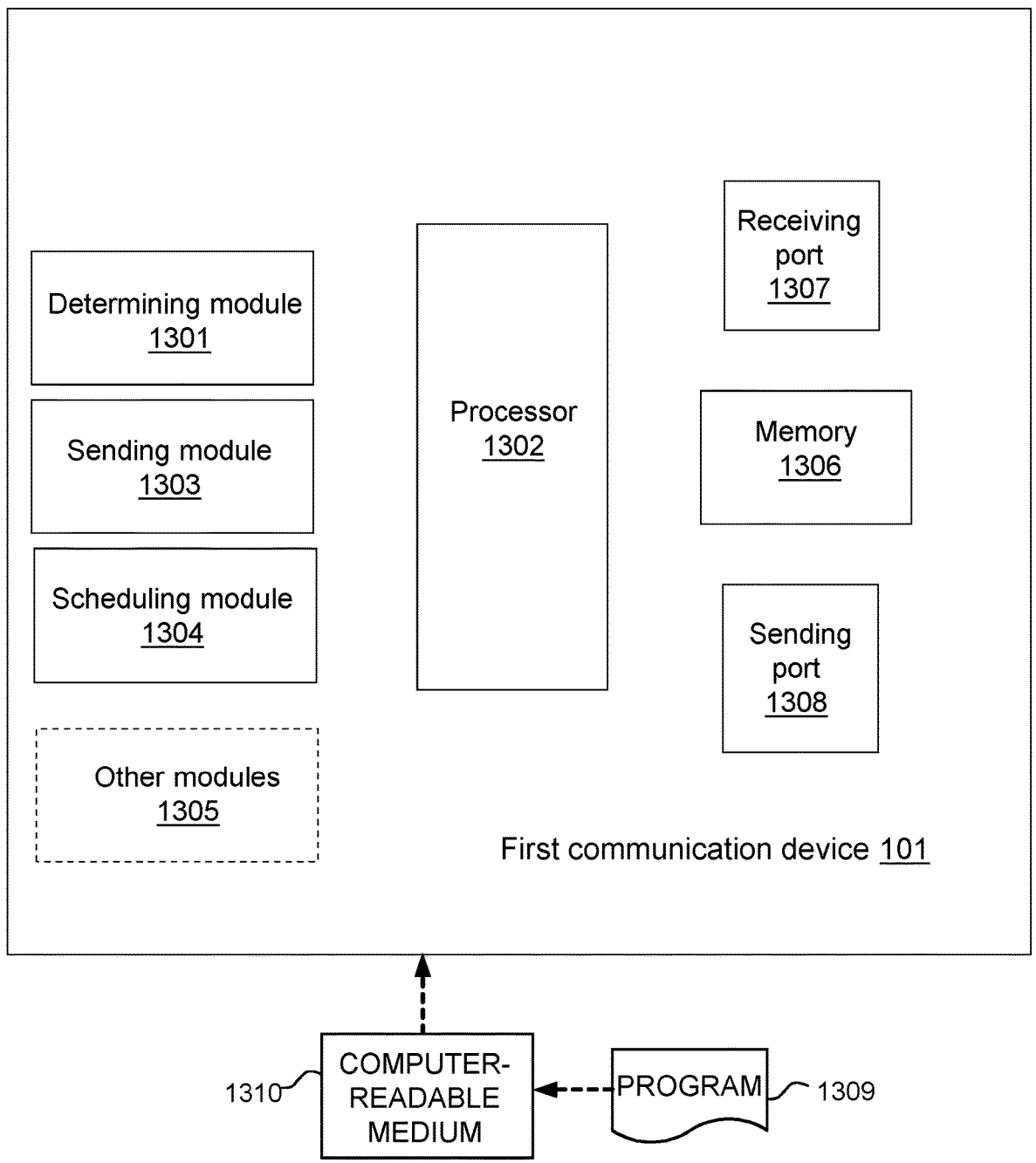
FIG. 13 is a block diagram of a first communication device that is configured according to some embodiments.

The embodiments herein may be implemented through one or more processors, such as the processor 1302 in the first communication device 101 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 1306 comprising one or more memory units. The memory 1306 is arranged to be used to store obtained information, store data, configurations, schedulings, and applications etc. to perform the methods herein when being executed in the first communication device 101.

In some embodiments, the first communication device 101 may receive information, e.g., from the one or more third communication devices 103, or from second communication device 102, through a receiving port 1307. In some embodiments, the receiving port 1307 may be, for example, connected to the two or more antennas in first communication device 101. In other embodiments, the first communication device 101 may receive information from another structure in the communications network 100 through the receiving port 1307. Since the receiving port 1307 may be in communication with the processor 1302, the receiving port 1307, may then send the received information to the processor 1302. The receiving port 1307 may also be configured to receive other information.

The processor 1302 in the first communication device 101 may be further configured to transmit or send information to e.g., to the second communication device 102, through a sending port 1308, which may be in communication with the processor 1302 and the memory 1306.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Those skilled in the art will also appreciate that the determining module 1301, the sending module 1303, the scheduling module 1303, and the other modules 1305 described above may refer to a combination of analog and digital modules, and/or one or more processors configured with software and/or firmware, e.g., stored in memory, that, when executed by the one or more processors such as the processor 1302 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301 and 1303-1304 described above may be implemented as one or more applications running on one or more processors such as the processor 1302.

Thus, the methods according to the embodiments described herein for the first communication device 101 may be implemented by means of a computer program 1309 product, comprising instructions, i.e., software code portions, which, when executed on at least one processor 1302, cause the at least one processor 1302 to carry out the actions described herein, as performed by the first communication device 101. The computer program 1309 product may be stored on a computer-readable storage medium 1310. The computer-readable storage medium 1310, having stored thereon the computer program 1309, may comprise instructions which, when executed on at least one processor 1302, cause the at least one processor 1302 to carry out the actions described herein, as performed by the first communication device 101. In some embodiments, the computer-readable storage medium 1310 may be a non-transitory computer-readable storage medium, such as a CD ROM disc, or a memory stick. In other embodiments, the computer program 1309 product may be stored on a carrier containing the computer program 1309 just described, wherein the carrier is one of an electronic signal, optical signal, radio signal, or the computer-readable storage medium, as described above.

To perform the method actions described above in relation to FIG. 12, the second communication device 102 is configured to decode the downlink data received from the first communication device 101. The second communication device 102 may comprise the following arrangement depicted in FIG. 14. As stated earlier, the first communication device 101 and the second communication device 102 are configured to operate in the communications network 100.

The detailed description of some of the following corresponds to the same references provided above, in relation to the actions described for the second communication device 102, and will thus not be repeated here. For example, in some embodiments, the first communication device 101 and the second communication device 102 may be configured to operate in the communications network 100 with a first TDD configuration, and the one or more third communication devices 103 may be configured to operate in the communications network 100 with a second TDD configuration, which first TDD configuration may be different than the second TDD configuration.

The first communication device 101 is further configured to, e.g., by means of a determining module 1401 configured to, determine whether the second communication device 102 is scheduled on the carrier 141 assigned to the second communication device 102 for receiving the downlink control information from the first communication device 101, or on another carrier. To determine is based on whether time-frequency resources in which the determining is configured to be performed are configured to allow the sending of uplink information, or not, on the adjacent carrier 142 to the carrier 141. The sending is configured to be by the one or more third communication devices 103 configured to operate in the communications network 100. The determining module 1401 may be the processor 1402 of the second communication device 102, or an application running on such processor.

The second communication device 102 is further configured to, e.g., by means of a receiving module 1402 configured to, receive the downlink data from the first communication device 101.

The receiving module 1402 may be a processor 1402 of the receiving device 102, or an application running on such processor.

The second communication device 102 may be further configured to, e.g., by means of a decoding module 1404 configured to, decode the received downlink information based on the determining whether the second communication device 102 is scheduled on the carrier 141 or on the other carrier. The decoding module 1404 may be the processor 1402 of the second communication device 102, or an application running on such processor.

The second communication device 102 may be configured to perform other actions with other modules 1405 configured to perform these actions within the second communication device 102. Each of the other modules 1405 may be the processor 1402 of the second communication device 102, or an application running on such processor.

Figure 14:
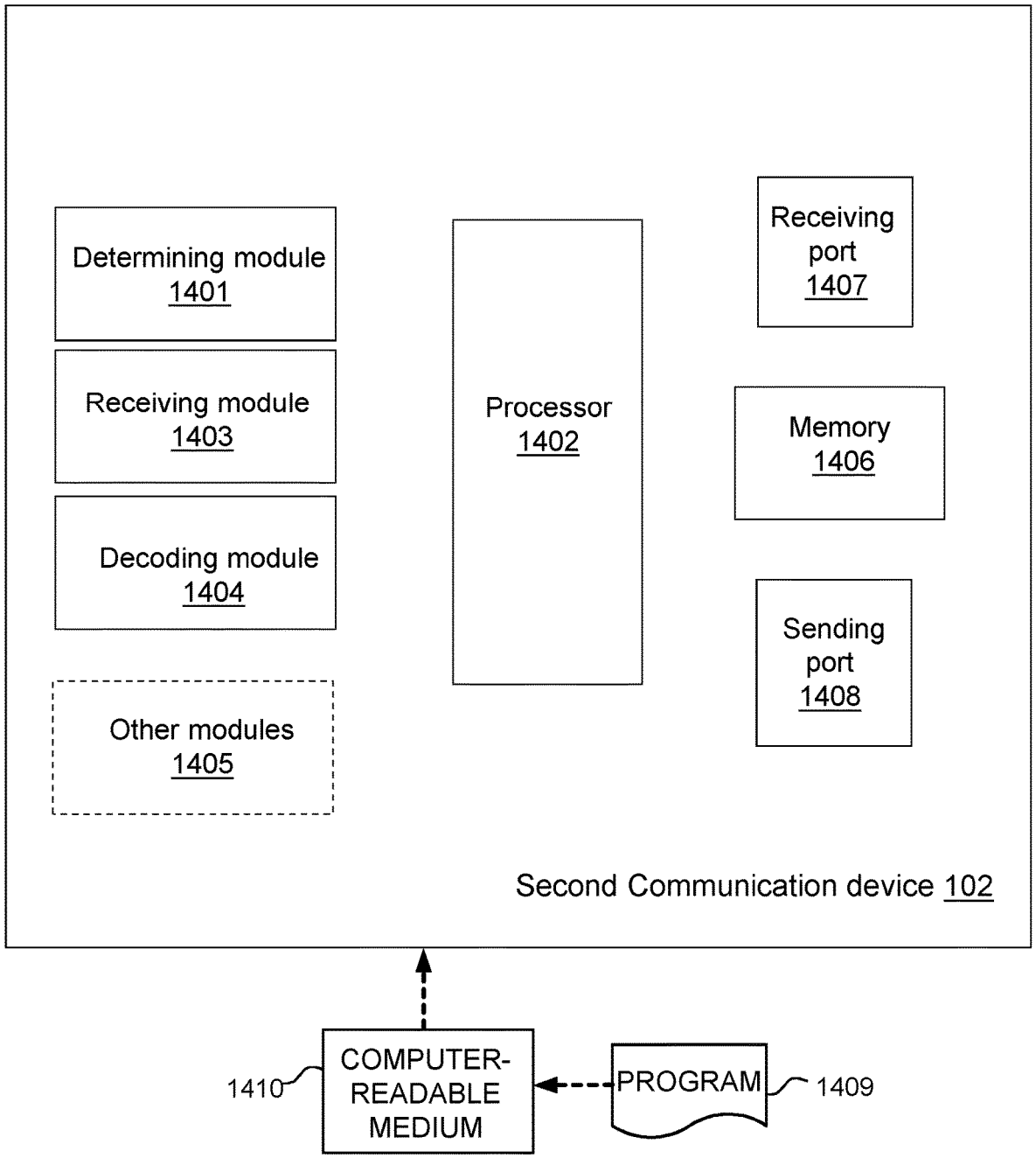
FIG. 14 is a block diagram of a second communication device that is configured according to some embodiments.

The embodiments herein may be implemented through one or more processors, such as the processor 1402 in second communication device 102 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 1406, comprising one or more memory units. The memory 1406 is arranged to be used to store obtained information, store data, configurations, schedulings, and applications etc. to perform the methods herein when being executed in the second communication device 102.

In some embodiments, the second communication device 102 may receive information, e.g., from the first communication device 101, through a receiving port 1407. In some embodiments, the receiving port 1407 may be, for example, connected to the two or more antennas in the second communication device 102. In other embodiments, the second communication device 102 may receive information from another structure in the communications network 100 through the receiving port 1407. Since the receiving port 1407 may be in communication with the processor 1402, the receiving port 1407, may then send the received information to the processor 1402. The receiving port 1407 may also be configured to receive other information.

The processor 1402 in the second communication device 102 may be further configured to transmit or send information to e.g., to the first communication device 101, through a sending port 1408, which may be in communication with the processor 1402 and the memory 1406.

The second communication device 102 may comprise an interface unit to facilitate communications between the second communication device 102 and other nodes or devices, e.g., the first communication device 101. The interface may, for example, include a transceiver configured to transmit and receive radio signals over an air interface in accordance with a suitable standard.

Those skilled in the art will also appreciate that the determining module 1401, the receiving module 1403, the decoding module 1404, and the other modules 1405, described above may refer to a combination of analog and digital modules, and/or one or more processors configured with software and/or firmware, e.g., stored in memory, that, when executed by the one or more processors such as the processor 1402 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1401, 1403-1405 described above may be implemented as one or more applications running on one or more processors such as the processor 1402.

Thus, the methods according to the embodiments described herein for the second communication device 102 may be implemented by means of a computer program 1409 product, comprising instructions, i.e., software code portions, which, when executed on at least one processor 1402, cause the at least one processor 1402 to carry out the actions described herein, as performed by the second communication device 102. The computer program 1409 product may be stored on a computer-readable storage medium 1410. The computer-readable storage medium 1410, having stored thereon the computer program 1409, may comprise instructions which, when executed on at least one processor 1402, cause the at least one processor 1402 to carry out the actions described herein, as performed by the second communication device 102. In some embodiments, the computer-readable storage medium 1410 may be a non-transitory computer-readable storage medium, such as a CD ROM disc, or a memory stick. In other embodiments, the computer program 1409 product may be stored on a carrier containing the computer program 1409 just described, wherein the carrier is one of an electronic signal, optical signal, radio signal, or the computer-readable storage medium, as described above.

Further Object of the Present Disclosure

It is a further object of the present disclosure to improve the performance of a communications network by providing improved methods for reducing interference from a first network node on a second network node. Within this section, the term "further disclosure" may be understood to refer to a group of embodiments which is different to those that have been described thus far.

As part of the development of further disclosure herein, another problem with existing methods will first be identified and discussed, based on the communications network 100, an example of which is illustrated in FIG. 5, and the non-limiting deployment scenario of the communications network 100 described in relation to FIG. 7.

As explained earlier, with the introduction of additional TDD configurations, an operator using a downlink-only TDD configuration has a severe impact on the uplink performance of the neighbor operators due to strong downlink-to-uplink, i.e., BS-to-BS interference. This may be a valid concern if the additional TDD configuration is used on a macro network, which is interfering on the macro network of another operator. However, the downlink-only configuration may be used in pico nodes. This may reduce the downlink-to-uplink interference to a macro network on an adjacent carrier such that the interference is not high anymore.

In general, due to transmit non-linearity, some of the transmitted signals may be leaked to the other frequency bands. Adjacent Channel Leakage Ratio (ACLR) may be used as a metric to measure the leakage due to non-linearity of the transmitter. The current 3GPP standard limits the emission, that is, interference, to −45 dBc, which may be understood as the relative levels of noise or sideband power, compared with the carrier power. However, with an additional TDD configuration, even with −45 dBc, the loss in the uplink throughput of neighbor frequencies is more.

The further disclosure herein may relate to a method of adjusting emission levels in the first communication device 101. The first communication device 101 may be, e.g., the first network node 111, which may also be referred to as an aggressor node, operating in a TDD wireless communication system, such that adjacent channel interference at the fourth communication device 104. Any reference in the further disclosure to the first network node 111 may be understood to equally refer to the first communication device 101. The first communication device 101 may be, e.g., the second network node 112, which may also be referred to as a victim node, is avoided or reduced. Any reference in the further disclosure to the second network node 112 may be understood to equally refer to the fourth communication device 104. Similarly, any reference in the further disclosure to the UE 121 may be understood to equally refer to the second communication device 102, e.g., the first wireless device 121. Any reference in the further disclosure to the UE 122 may be understood to equally refer to one of the one or more third communication devices 103, e.g., the second wireless device 122.

Figure 15:
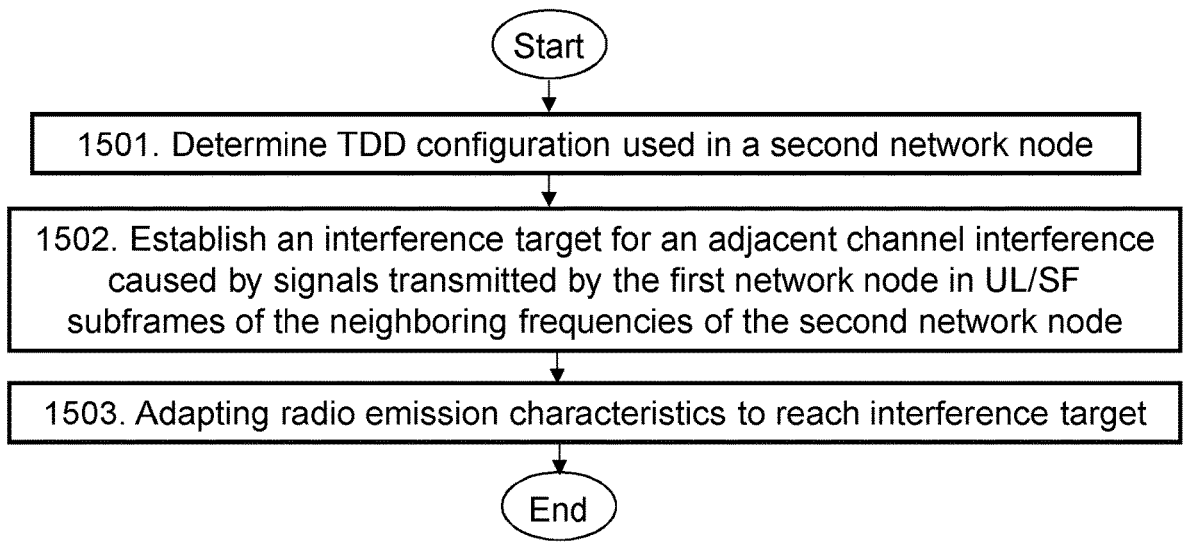
FIG. 15 is a schematic diagram illustrating an example of a method in a first communication device, according to further disclosure.
Figure 17:
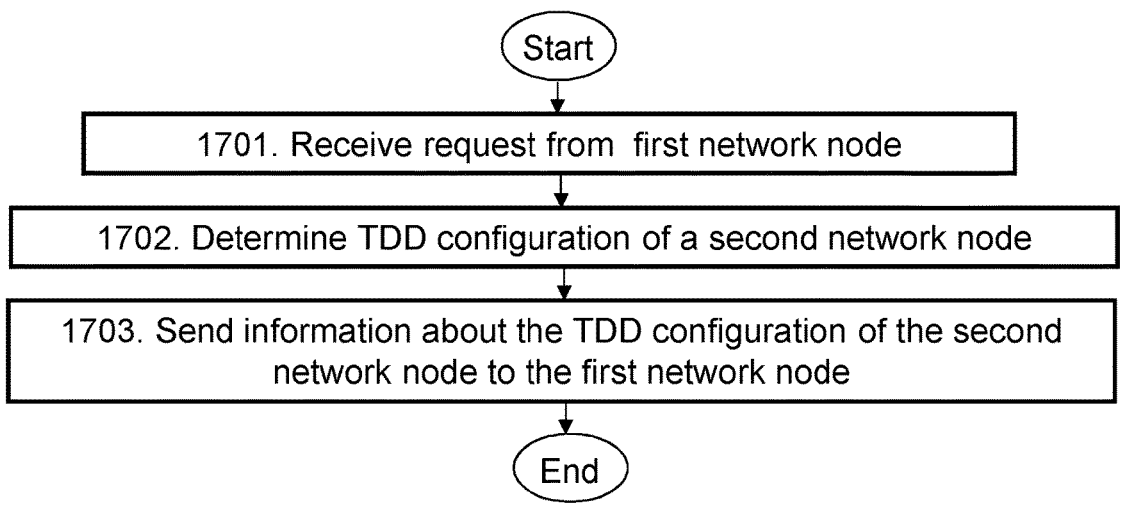
FIG. 17 is a schematic diagram illustrating actions of a method in a second communication device, according to further disclosure.
Figure 16:
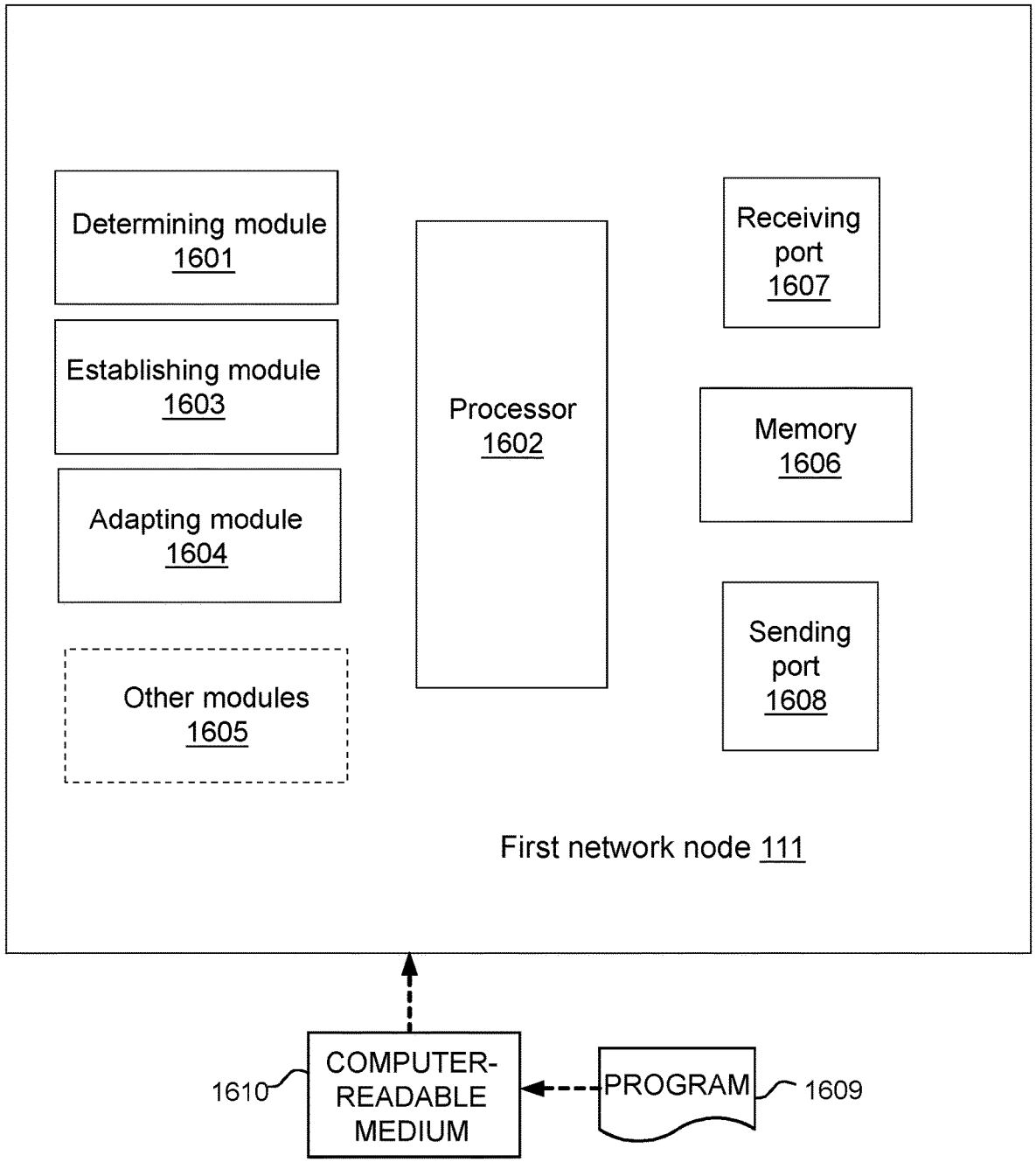
FIG. 16 is a block diagram of a first communication device that is configured according to further disclosure.

Several examples of the further disclosure are comprised herein. More specifically, the following are a first network node related further disclosure, a second network node related further disclosure and a UE related further disclosure. In particular, the further disclosure relates to the first communication device, the second communication device, the fourth communication device, and methods therein for reducing interference The first network node further disclosure relates to FIGS. 15 and 16. FIG. 15 is a flowchart illustrating an example of a method performed by a first network node such as the first network node 111. FIG. 16 is a block diagram of a first network node 111 that is configured according to the further disclosure.

The method performed by the first network node 111 is for adjusting the emission levels in the first network node 111 transmitting to a wireless device, e.g., the first wireless device 121, such as a UE, which may be referred to in the further disclosure as "the UE 121" on at least a first carrier frequency. The first network node 111, the UE 121 and the second network node 112 operate in the communications network 100, e.g. a wireless communications network. The method may comprise one or more of the following actions:

Determining 1501, e.g., identifying, a TDD configuration, which may also be referred to as a TDD pattern, used in the second network node 112. The second network node 112 operates, in the further disclosure, one or more neighboring frequencies, which may also be referred to as adjacent carriers, to the first carrier frequency. The neighboring frequencies are different than the first carrier frequency. The first network node 111 is configured to perform this action 1501, e.g. by means of a determining module 1601 configured to perform this action, within the first network node 111. The determining module 1601 may be a processor 1602 of the first network node 111, or an application running on such processor.

Establishing 1502, which may also be referred to as setting, a target interference limit for an adjacent channel interference caused by signals transmitted by the first network node 111 on the first carrier frequency in UL and/or Special, SF, subframes of the neighboring frequencies operated by the second network node 112, based on the determined TDD configuration. The interference target may be established such that the interference caused by the first network node 111 in the UL and/or SF subframes is reduced. The first network node 111 is configured to perform this action 1502, e.g. by means of an establishing module 1603 configured to perform this action, within the first network node 111. The establishing module 1603 may be the processor 1602 of the first network node 111, or an application running on such processor.

Adapting 1503 radio emission characteristics, such as e.g. ACLR, unwanted emission etc., of signals transmitted on the first carrier frequency in subframes to reach the established interference target. The first network node 111 is configured to perform this action 1503, e.g. by means of an adapting module 1604 configured to perform this action, within the first network node 111. The adapting module 1103 may be the processor 1602 of the first network node 111, or an application running on such processor.

In some examples herein, the determining 1501 the TDD configuration may comprise listening to a PUCCH and/or a PUSCH transmission of the neighbour frequency over a period of time to judge, which may also be referred to as derive the TDD configuration.

In some examples herein, the determining 1501 the TDD configuration may comprise listening to a PDCCH and/or a PDSCH transmission of the neighbour frequency over a period of time to judge, which may also be referred to as derive the TDD configuration.

In some examples herein, the determining 1601 the TDD configuration may comprise receiving/retrieving information about the TDD configuration used in the second network node 112 from the fourth communication device 104, such as the second network node 112 or a wireless device such as the UE 121. The information may e.g. comprise the frequency TDD configuration or information about a group of subframes for which a specific interference target may be applied. In some embodiments retrieving may comprise sending a request for information to a second communication device and/or receiving information from the second network device.

In some examples herein, the establishing 1602 of the target interference limit may comprise establishing a specific target dB value. The target dB value in UL and/or SF subframes may be greater than or equal to −45 dBc. In a further embodiment the target dB value in UL and/or SF subframes may be greater than or equal to −50 dBc.

In some examples herein, the adapting 1603 radio emission characteristics may comprise applying predistorting techniques.

In some examples herein, the adapting 1603 radio emission may comprise applying a power backoff.

The first network node 111 may be configured to perform other actions with other modules 1605 configured to perform these actions within the first network node 111. Each of the other modules 1605 may be the processor 1602 of the first network node 111, or an application running on such processor.

In some examples all the actions may be performed. In some embodiments, one or more actions may be performed. One or more embodiments may be combined, where applicable. All possible combinations are not described to simplify the description.

According to the further disclosure herein, the first network node 111, such as e.g. a downlink only TDD eNode B, may check the neighbor frequencies, and may determine their TDD configuration. Based on the TDD configuration, the first network node 111 may adapt its transmission chain such that ACLR≥−45 dBc for its subframes, for which the downlink transmission interferes with the neighbor frequency TDD downlink transmissions from the second network node 112. In the subframes where the downlink transmission of the first network node 111 interferes with the uplink transmission of the neighbor frequencies of the second network node 112, the first network node 111 may adapt its parameters such that ACLR≥−50 dBc, or any value greater than −45 dBc, thereby minimizing the impact of the downlink only transmission. Methods herein therefore mitigate the drawbacks of deploying an additional TDD configuration.

The first network node 111 may comprise the arrangement depicted in FIG. 16. The detailed description of the arrangement of FIG. 16 corresponds to that provided above in relation to FIG. 13, unless otherwise noted as, e.g., in relation to the determining module 1601, the establishing module 1603 and the adapting module 1604, and will thus not be repeated here. Those skilled in the art will also appreciate that determining module 1601, the establishing module 1603, the adapting module 1604 and the other modules 1605, described above may refer to a combination of analog and digital modules, as described earlier regarding the modules of FIG. 13. Also, the first network node 111 may comprise an interface unit to facilitate communications between the first network node 111 and other nodes or devices, e.g., the second network node 112 and/or the UE 121.

The UE further disclosure relates to FIGS. 15 and 16. FIG. 15 is a flowchart illustrating an example of a method performed by a wireless device, such as the UE 121. FIG. 16 is a block diagram of the UE 121 that is configured according to the further disclosure.

The method performed by the UE 121 is for adjusting the emission levels in the first network node 111 transmitting to a wireless device, such as the UE 121 on at least a first carrier frequency. The first network node 111, the UE 121 and the second network node 112 operate in the communications network 100, e.g. a wireless communications network. The method may comprise one or more of the following actions:

Receiving 1701 a message from the first network node 111, which message may comprise a request for information about a TDD configuration, which may also be referred to as a TDD pattern, used in the second network node 112 operating one or more neighboring frequencies, which may also be referred to as adjacent carriers, to the first carrier frequency. The UE 121 is configured to perform this action 1701, e.g. by means of a receiving module 1801 configured to perform this action, within the UE 121. The receiving module 1801 may be a processor 1802 of the UE 121, or an application running on such processor.

Determining 1702 the TDD configuration of the second network node 112. The TDD configuration may be determined by reading a system information of the second network node 112. The UE 121 may be configured to perform this action 1702, e.g. by means of a determining module 1803 configured to perform this action, within the UE 121. The determining module 1803 may be the processor 1802 of the UE 121, or an application running on such processor.

Sending 1703 the determined TDD configuration to the first communication device 101. The UE 121 may be configured to perform this action 1703, e.g. by means of a sending module 1804 configured to perform this action, within the UE 121. The sending module 1804 may be the processor 1802 of the UE 121, or an application running on such processor.

The UE 121 may be configured to perform other actions with other modules 1805 configured to perform these actions within the UE 121. Each of the other modules 1805 may be the processor 1802 of the UE 121, or an application running on such processor.

In some examples all the actions may be performed. In some examples, one or more actions may be performed. One or more examples may be combined, where applicable. All possible combinations are not described to simplify the description.

Figure 18:
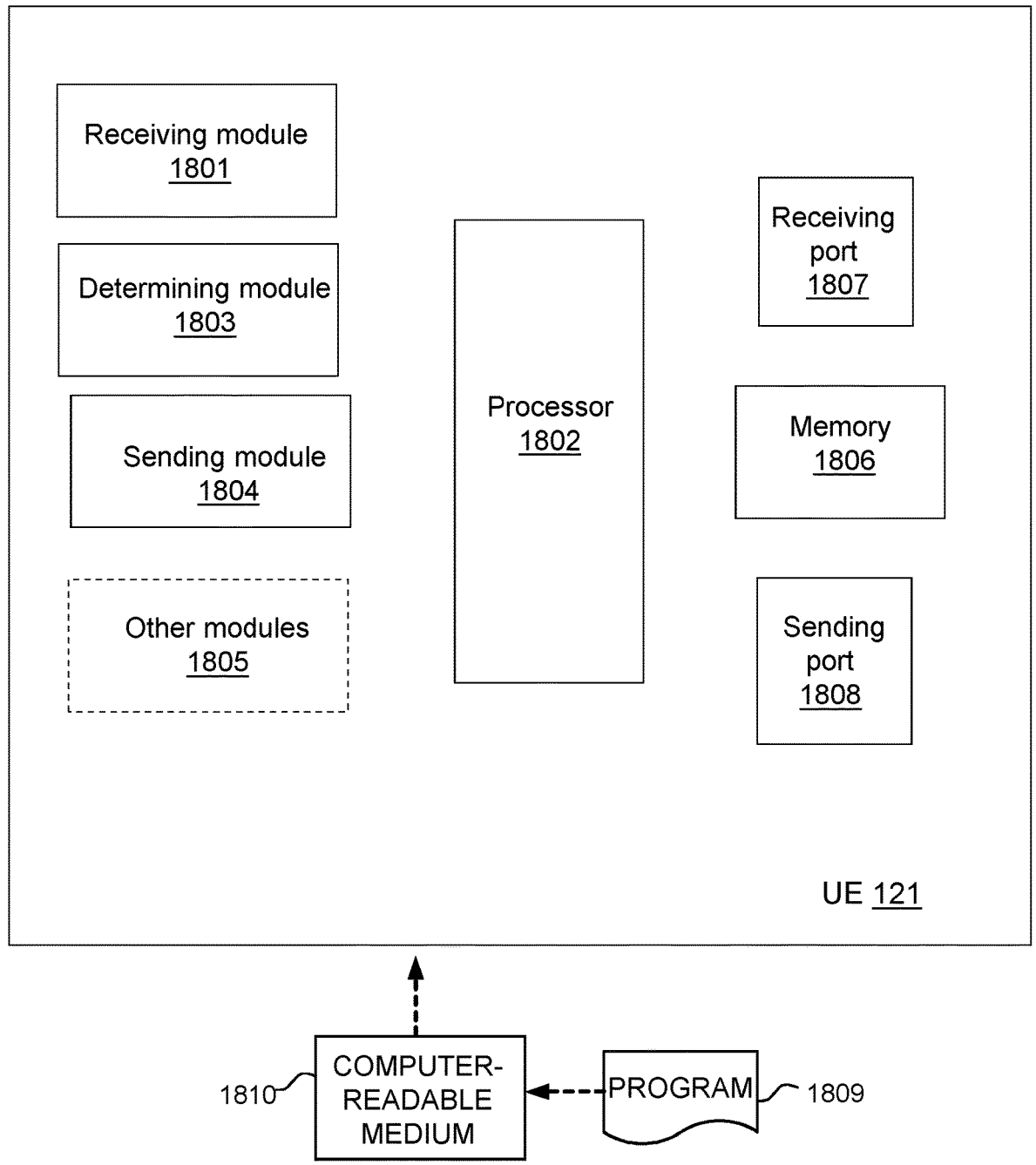
FIG. 18 is a block diagram of a second communication device that is configured according to further disclosure.

The UE 121 may comprise the arrangement depicted in FIG. 18. The detailed description of the arrangement of FIG. 18 corresponds to that provided above in relation to FIG. 14, unless otherwise noted as, e.g., in relation to the receiving module 1801, the determining module 1803 and the sending module 1804, and will thus not be repeated here. Those skilled in the art will also appreciate that receiving module 1801, the determining module 1803, the sending module 1804 and the other modules 1805, described above may refer to a combination of analog and digital modules, as described earlier regarding the modules of FIG. 14.

Figure 19:
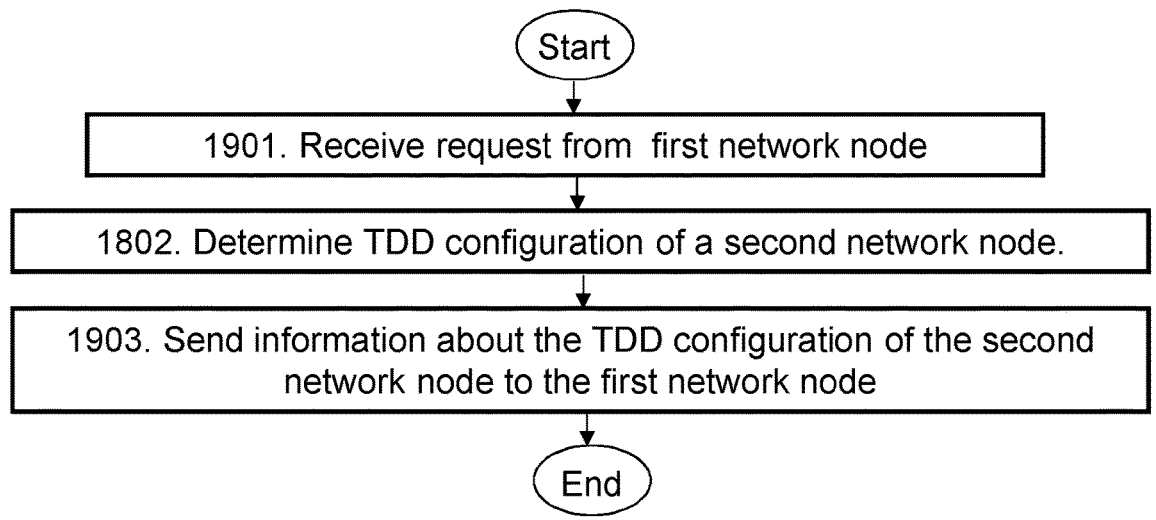
FIG. 19 is a schematic diagram illustrating actions of a method in a fourth communication device, according to further disclosure.
Figure 20:
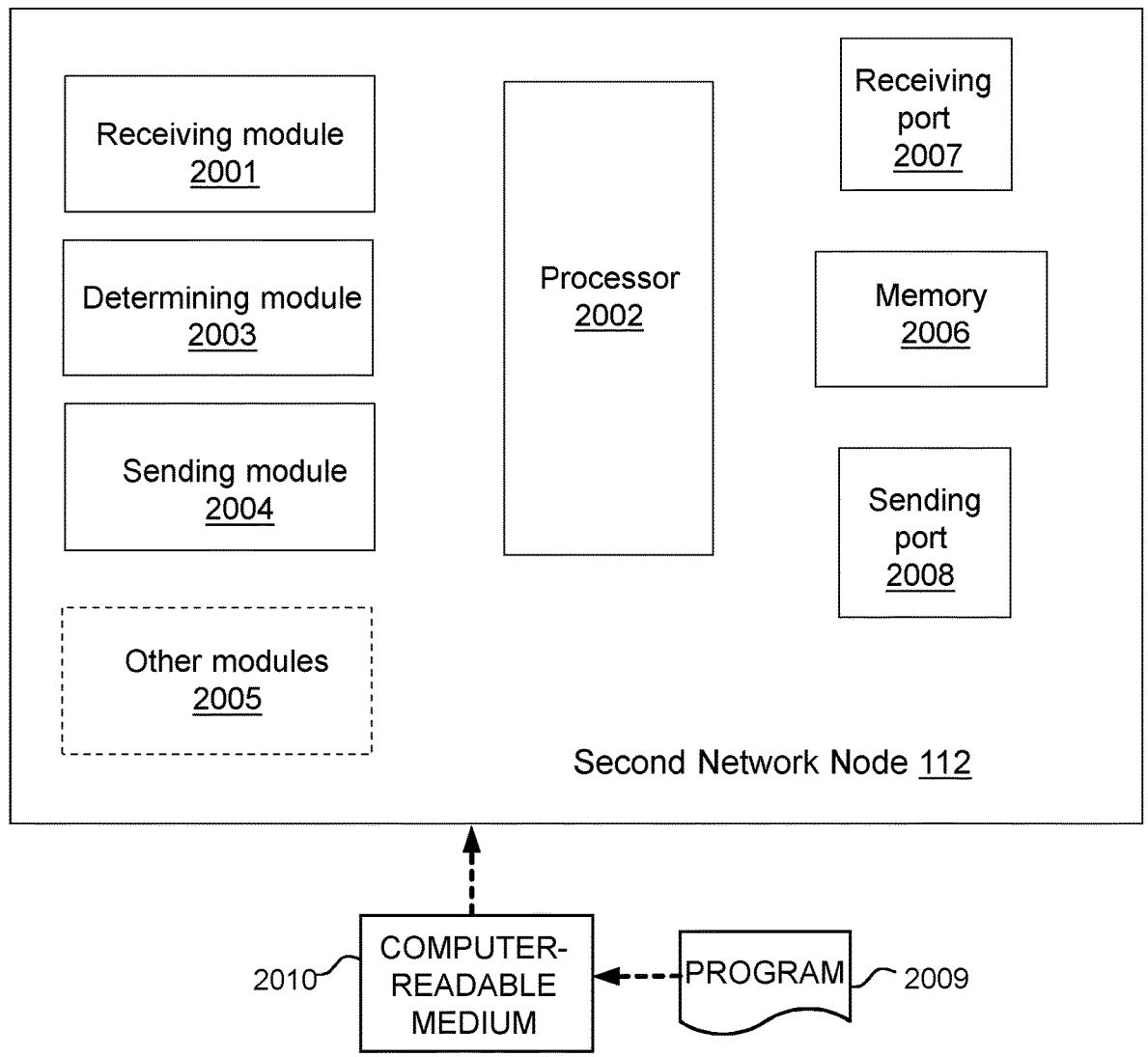
FIG. 20 is a block diagram of a fourth communication device that is configured according to further disclosure.

The second network node 112 related embodiments relate to FIG. 19 and FIG. 20. FIG. 19 is a flowchart illustrating an example of a method performed by a second network node, such as the second network node 112. FIG. 20 is a block diagram of a second network node 112 that is configured according to the further disclosure.

The method performed by the second network node 112 is for adjusting the emission levels in the first network node 111 transmitting to a wireless device, such as the UE 122 on at least a first carrier frequency. The first network node 111, the UE 122 and the second network node 112 operate in the communications network 100, e.g. a wireless communications network. The method may comprise one or more of the following actions:

Receiving 1901 a message from the first network node 111, which message may comprise a request for information about a TDD configuration, which may also be referred to as a TDD pattern, used in the second network node 112 operating one or more neighboring frequencies, which may also be referred to as adjacent carriers, to the first carrier frequency. The second network node 112 is configured to perform this action 1902, e.g. by means of a receiving module 2001 configured to perform this action, within the second network node 112. The receiving module 2001 may be a processor 2002 of the second network node 112, or an application running on such processor.

Determining 1902 the TDD configuration of the second network node 112. The TDD configuration may be determined by reading a system information of the second network node 112. The second network node 112 may be configured to perform this action 1902, e.g. by means of a determining module 2003 configured to perform this action, within the second network node 112. The determining module 2003 may be the processor 2002 of the second network node 112, or an application running on such processor.

Sending 1903 the determined TDD configuration to the first network node 111. The second network node 112 may be configured to perform this action 1903, e.g. by means of a sending module 2004 configured to perform this action, within the second network node 112. The sending module 2004 may be the processor 2002 of the second network node 112, or an application running on such processor.

The second network node 112 may be configured to perform other actions with other modules 2005 configured to perform these actions within the second network node 112. Each of the other modules 2005 may be the processor 2002 of the second network node 112, or an application running on such processor.

In some embodiments all the actions may be performed. In some embodiments, one or more actions may be performed. One or more embodiments may be combined, where applicable. All possible combinations are not described to simplify the description.

The second network node 112 may comprise the arrangement depicted in FIG. 20. The detailed description of the arrangement of FIG. 13 corresponds to that provided above in relation to FIG. 13, unless noted above in relation to the receiving module 2001, the determining module 2003, the sending module 2004 and the other modules 2005, and will thus not be repeated here. Those skilled in the art will also appreciate that the receiving module 2001, the determining module 2003, the sending module 2004 and the other modules 2005, described above may refer to a combination of analog and digital modules, as described earlier regarding the modules of FIG. 13. The second network node 112 may comprise an interface unit to facilitate communications between the second network node 112 and other nodes or devices, e.g., the first network node 111. The interface may, for example, include a transceiver configured to transmit and receive radio signals over an air interface in accordance with a suitable standard.

To summarize the further disclosure in other words, the aggressor node, e.g. eNB, operating at least a first carrier frequency may:

In agreement with Action 1501, determine a TDD configuration used in at least one victim node operating one or more neighboring frequencies, which are different than the first carrier frequency and In agreement with Action 1503, adapt radio emission characteristics, e.g., ACLR, unwanted emission etc., of signals transmitted on the first carrier frequency based on the determined TDD configuration with the aim that the adjacent channel interference caused by the aggressor node in the uplink sub frames of the neighboring frequencies is reduced. For example, the aggressor node may transmit signals by attempting to achieve ACLR=−45 in DL subframes and −50 dBc in UL subframes, or better, as experienced at the victim node.

Figure 21:
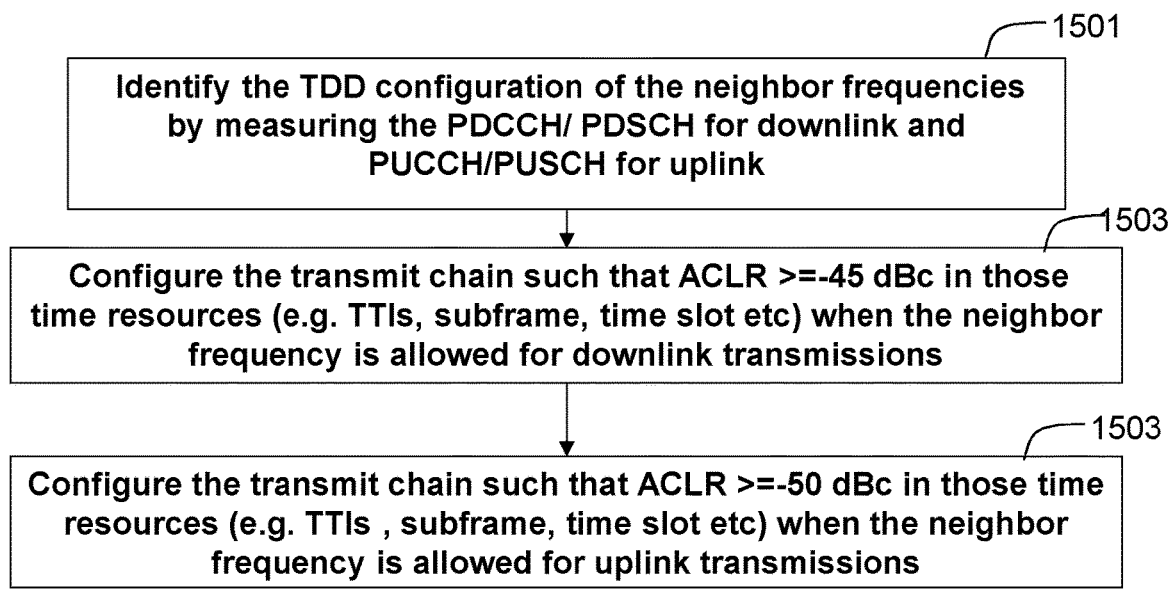
FIG. 21 is a schematic diagram illustrating a non-limiting example of a method performed in a first network node, according to further disclosure.

The steps performed at the first network node 111, which may also be referred to as a transmission node or an aggressor node, according to one non-limiting example of the further disclosure herein are shown in the block diagram as shown in FIG. 21. In agreement with Action 1501, the first network node 111 may identify the TDD configuration of the neighbor frequencies by measuring the PDCCH/PDSCH for downlink and PUCCH/PUSCH for uplink. In agreement with Action 1503, the first network node 111 may a) configure the transmit chain such that ACLR≥−45 dBc in those time resources, e.g. TTIs, subframe, time slot etc. when the neighbor frequency is allowed for downlink transmissions, and b) configure the transmit chain such that ACLR≥−50 dBc in those time resources, e.g., TTIs, subframe, time slot etc., when the neighbor frequency is allowed for uplink transmissions.

A first example of the further disclosure may therefore relate to a method in the first network node 111, the transmission node, to determine the TDD configuration and adjusting the transmission chain parameters.

A second example of the further disclosure may relate to a method according to the first example, where the adjusting of the parameters is done such that to achieve two values of ACLR according to the neighbor frequency downlink and uplink transmissions.

The examples of the further disclosure are explained by assuming the first network node 111 is transmitting with a DL only TDD configuration. However it may be understood that the further disclosure may be applicable to any eNode B or network node with any TDD configuration.

The main examples of the methods just described in relation to the further disclosure are provided below.

Examples of the Method at the First Network Node 111, for Adjusting the Transmission Parameters According to the Neighbor Frequency TDD Configuration, According to Action 1503

As explained earlier, the first network node 111 may adjust the transmission parameters according to the neighbor frequency TDD configuration. Adjusting the transmission parameters may refer to the network node using either of the following two techniques to achieve the desired radio emission characteristics, e.g. ACLR, unwanted emission, out of band emission etc. For example, if the ACLR limits are −45 dBc and −50 dBc for the downlink and uplink time resources, e.g., TTIs, subframes, slots etc, respectively of the neighbor frequency.

a. Pre-distorting Techniques: Using two types of digital pre-distortion techniques the first network node 111 may limit the ACLR to two different values. For example, the first network node 111 may use a more sophisticated Digital Pre-Distortion (DPD) algorithm to limit the ACLR to −50 dBc and, and a less sophisticated DPD algorithm to limit the ACLR to −45 dBc. In case of a less sophisticated DPD algorithm, the number of computations applied by the first network node 111 may be below a threshold to achieve the target ACLR, e.g., −45 dBc. This may involve less processing and complexity. In case of a more sophisticated DPD algorithm, the number of computations applied by the first network node 111 may be above a threshold to achieve the target ACLR, e.g. −50 dBc. This may involve more processing and complexity in the first network node 111. To switch between different emission characteristics, e.g., ACLR values, over time, the first network node 111 may also need additional hardware resources, e.g. processors, memory resources, Radio Frequency (RF) filters. For example the first network node 111 may use a first type of RF filter and a second type of RF filter for transmitting signals to achieve ACLR of −50 dBc and −45 dBc respectively. The first type of RF filter, as compared to the second type of RF filter, may be capable of suppressing more emissions outside the operating frequency of the aggressor node when transmitting signals.

In another example of the further disclosure, with only one DPD algorithm, the first network node 111 may apply two types of ACLR. For example, to achieve the ACLR of −50 dBc, the DPD loop may need to run e.g., 25 times. Hence, if the first network node 111 runs the loop only for 20 times, an ACLR of −45 dBc may be achieved.

b. Power backoff: In this method, rather than using linearization techniques, the first network node 111 may use two types of power back offs, such that two ACLR values may be obtained based on the neighbor frequency TDD configuration. For example, with 3 dB power back off, an ACLR of −45 dBc may be obtained, then to achieve −50 dBc, the first network node 111 may need to back off by 4.5 dB in power.

In another example of the further disclosure, the first network node 111 may use both these techniques to obtain two types of ACLR values. For example, it may use the DPD algorithm to achieve an ACLR value of −45 dBc, and may use power back off to achieve an ACLR value of −50 dBc.

Examples of the Method at the First Network Node 111, for Adjusting the Transmission Parameters According to a Pattern in the Neighbor Frequency TDD Configuration, According to Action 1503

In yet another example of the further disclosure the aggressor network node may adjust the emission characteristics of its transmitted radio signals according to a pattern of time resources used in the victim network node.

For example, the pattern may comprise a certain maximum number of UL subframes in the victim node every frame or group of frames where emissions may need to be reduced, compared to the emissions in the DL subframes in the victim node. In another example, the UL subframes where emissions may need to be reduced may also be defined as those which contain specific types of signals e.g. sounding reference signals, UL control channel etc. The pattern may be determined by the victim node and transmitted to the aggressor node. The exchange of such pattern may take place via interface between the two nodes or even via a UE. For example, the UE 121 served by the aggressor node may acquire the pattern by reading the system information of the victim node and send the acquired pattern to the aggressor node.

The objective of the pattern may be understood to be to avoid the need for changing the emission levels between every UL and DL subframes. The method may allow the aggressor network node to use more a stringent emission level, e.g., ACLR −50 dBc, only in selected and most critical UL subframes e.g., those carrying more important signals in the UL. In this way, the processing and complexity in the aggressor network node may be reduced.

An example of such a pattern per radio frame, i.e., over 10 subframes, is:

[D U1 U2 U1 U1 D U1 U2 U1 U2], where:
- D represents a DL subframe where ACLR of −45 dBc is used by the aggressor node;
- U1 represents an UL subframe where ACLR of −45 dBc is used by the aggressor node; and
- U2 represents a UL subframe where ACLR of −50 dBc is used by the aggressor node. These subframes may be considered more critical in terms of carrying more vital signaling or data. Therefore U2 subframes may be protected more than subframes U1.

Method at the First Network Node 111 for Identifying the Neighbor Frequency TDD Configuration, According to Action 1501

As explained earlier, in one example of the further disclosure, the first network node 111 may identify the neighbor frequency TDD configuration. The first network node 111 may identify the TDD configuration by listening to the PUCCH/PUSCH transmissions of the neighbor frequency over a period of time and judge, which may also be referred to as derive, the TDD configuration.

In another example of the further disclosure, the first network node 111 may identify the neighbor frequency TDD configuration by listening to the PDCCH/PDSCH transmissions of the neighbor frequency over a period of time.

In yet another example of the further disclosure, the first network node 111 may determine the neighbor frequency TDD configuration by receiving the information about the TDD configuration used in the second network node 112, a victim network node, from another network node, e.g. from the victim network node, the second network node 112.

In yet another example of the further disclosure, the first network node 111 may determine the neighbor frequency TDD configuration by receiving the information about the TDD configuration used in the victim network node from the UE 121. For example the UE 121 served by the aggressor network node may acquire the information about the TDD configuration used in the victim network node, the second network node 112, by reading the system information of the victim network node. The UE 121 may then transmit the acquired information about the TDD configuration to the first network node 111.

An advantage of the further disclosure herein is that it allows to minimize the performance loss of the legacy systems and at the same time facilitates the deployment of downlink heavy TDD configurations. This enables co-existence between these two systems with minimum adjacent channel interference, and therefore facilitates a deployment of a new LTE TDD configuration.

Interference mitigation methods according to the further disclosure herein may be used to further reduce the downlink-to-uplink interference. For instance, BSs may detect strong neighbors on adjacent carriers by measuring a Primary Synchronization Signal (PSS)/Secondary Synchronization Signal (SSS)/CRS on adjacent carriers before starting up and occasionally during operation. If neighbors with low-to-medium interference are detected, i.e., low-to-medium BS-BS interference may occur, the pico BSs may lower the transmission power accordingly. If neighbors with strong interference are detected, the pico BSs may decide to use the same UL/DL configuration as the neighbor eNB and by that avoid BS to BS interference completely.

Since BS-BS interference is not specific to the new DL-heavy TDD configurations, such methods may be applied also to existing TDD configurations for the case that networks on adjacent carriers are using different UL/DL configurations.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

The invention claimed is:

1. A method performed by a first communication device for sending downlink information to a second communication device, the first communication device and the second communication device operating in a communications network, the method comprising:
   determining whether or not one or more third communication devices operating in the communications network are sending uplink information on an adjacent carrier, wherein the adjacent carrier is adjacent to a carrier assigned to the first communication device for sending the downlink information to the second communication device; and
   sending the downlink information to the second communication device on the carrier, in response to determining that the one or more third communication devices are not sending uplink information on the adjacent carrier to the carrier used by the first communication device for sending the downlink information.

2. The method of claim 1, wherein the determining whether or not the one or more third communication devices are sending uplink information is performed in time-frequency resources, and is based on whether the time-frequency resources are configured for the sending of uplink information or not.

3. The method of claim 2, wherein the time-frequency resources are a first three Orthogonal Frequency Division Multiplexing symbols in a subframe.

4. The method of claim 1, wherein the determining whether or not the one or more third communication devices are sending uplink information is only performed in subframes 2, 3, 4, 6, 7, 8, and 9.

5. The method of claim 1, wherein the downlink information is data, and wherein for sending the downlink information to the second communication device the method further comprises:
   scheduling the second communication device using cross carrier scheduling, by sending downlink control information of the carrier on another carrier.

6. The method of claim 5, wherein the sending the downlink control information to the second communication device is performed on the other carrier when the second communication device is scheduled in time-frequency resources wherein the sending of uplink information is allowed.

7. The method of claim 1, wherein the downlink information is data, and wherein for sending the downlink information to the second communication device the method further comprises:
   scheduling the second communication device using component carrier scheduling, wherein the sending the downlink control information to the second communication device is performed on the carrier, when the second communication device is scheduled in time-frequency resources wherein the sending of uplink information is not allowed.

8. The method of claim 1, wherein the first communication device and the second communication device operate in the communications network with a first Time Division Duplex (TDD) configuration, and wherein the one or more third communication devices operate in the communications network with a second TDD configuration, which first TDD configuration is different than the second TDD configuration.

9. A non-transitory computer-readable storage medium comprising, stored thereon, a computer program comprising instructions that, when executed on at least one processor of a first communication device operating in a communications network with a second communication device, cause the at least one processor to:
 determine whether or not one or more third communication devices operating in the communications network are sending uplink information on an adjacent carrier, wherein the adjacent carrier is adjacent to a carrier assigned to the first communication device for sending downlink information to the second communication device; and
send the downlink information to the second communication device on the carrier, in response to determining that the one or more third communication devices are not sending uplink information on the adjacent carrier to the carrier used by the first communication device for sending the downlink information.

10. A method performed by a second communication device for decoding downlink data received from a first communication device, the first communication node and the second communication device operating in a communications network, the method comprising:
 determining whether the second communication device is scheduled on a carrier assigned to the second communication device for receiving downlink control information from the first communication device, or on another carrier, wherein the determining is based on whether time-frequency resources in which the determining is performed are configured to allow sending of uplink information, or not, on an adjacent carrier to the carrier, wherein the sending is by one or more third communication devices operating in the communications network;
 receiving the data from the first communication device; and
 decoding the received data based on the determining whether the second communication device is scheduled on the carrier or on the other carrier.

11. A non-transitory computer-readable storage medium comprising, stored thereon, a computer program, comprising instructions that, when executed on at least one processor of a second communication device operating in a communications network with a first communication device, cause the at least one processor to:
 determine whether the second communication device is scheduled on a carrier assigned to the second communication device for receiving downlink control information from the first communication device, or on another carrier, wherein the determining is based on whether time-frequency resources in which the determining is performed are configured to allow sending of uplink information, or not, on an adjacent carrier to the carrier, wherein the sending is by one or more third communication devices operating in the communications network;
 receive the data from the first communication device; and
 decode the received data based on the determining whether the second communication device is scheduled on the carrier or on the other carrier.

12. A first communication device configured to send downlink information to a second communication device, the first communication device and the second communication device being further configured to operate in a communications network, the first communication device comprising:
 a processor, and
 a memory operatively coupled to the processor and comprising program instructions for execution by the processor, whereby the first communication device is configured to:
  determine whether or not one or more third communication devices configured to operate in the communications network are sending uplink information on an adjacent carrier, wherein the adjacent carrier is adjacent to a carrier assigned to the first communication device for sending the downlink information to the second communication device, and
  send the downlink information to the second communication device on the carrier, in response to determining that the one or more third communication devices are not sending uplink information on the adjacent carrier to the carrier used by the first communication device for sending the downlink information.

13. The first communication device of claim 12, wherein the first communication device is configured to perform the determining of whether or not the one or more third communication devices are sending uplink information in time-frequency resources, based on whether the time-frequency resources are configured for the sending of uplink information or not.

14. The first communication device of claim 13, wherein the time-frequency resources are a first three Orthogonal Frequency Division Multiplexing symbols in a subframe.

15. The first communication device of claim 12, wherein the first communication device is configured to determine whether or not the one or more third communication devices are sending uplink information only in subframes 2, 3, 4, 6, 7, 8, and 9.

16. The first communication device of claim 12, wherein the downlink information is data, and wherein the first communication device is configured to send the downlink information to the second communication device such that said sending comprises:
 scheduling the second communication device using cross carrier scheduling, by sending downlink control information of the carrier on another carrier.

17. The first communication device of claim 16, wherein the first communication device is configured to send the downlink control information to the second communication device on the other carrier when the second communication device is scheduled in time-frequency resources wherein the sending of uplink information is allowed.

18. The first communication device of claim 12, wherein the downlink information is data, and wherein the first communication device is configured to send the downlink information to the second communication device such that said sending includes:
 scheduling the second communication device using component carrier scheduling, wherein the sending of the downlink control information to the second communication device is performed on the carrier, when the second communication device is scheduled in time-frequency resources wherein the sending of uplink information is configured to not be allowed.

19. The first communication device of claim 12, wherein the first communication device and the second communication device are configured to operate in the communications network with a first Time Division Duplex (TDD) configuration, and wherein the one or more third communication devices are configured to operate in the communications network with a second TDD configuration, which first TDD configuration is different than the second TDD configuration.

20. A second communication device configured to decode downlink data received from a first communication device, the first communication node and the second communication device being further configured to operate in a communications network, the second communication device comprising:
- a processor, and a memory operatively coupled to the processor and comprising program instructions for execution by the processor, whereby the second communication device is configured to:
- determine whether the second communication device is scheduled on a carrier assigned to the second communication device for receiving downlink control information from the first communication device, or on another carrier, wherein to determine is based on whether time-frequency resources in which the determining is configured to be performed are configured to allow sending of uplink information, or not, on an adjacent carrier to the carrier, wherein the sending is configured to be by one or more third communication devices configured to operate in the communications network,
- receive the downlink data from the first communication device, and
- decode the received downlink data based on the determining whether the second communication device is scheduled on the carrier or on the other carrier.

* * * * *